US008218638B2

(12) United States Patent
Chen

(10) Patent No.: US 8,218,638 B2
(45) Date of Patent: Jul. 10, 2012

(54) METHOD AND SYSTEM FOR OPTICAL FLOW BASED MOTION VECTOR ESTIMATION FOR PICTURE RATE UP-CONVERSION

(75) Inventor: Xuemin Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1262 days.

(21) Appl. No.: 11/932,298

(22) Filed: Oct. 31, 2007

(65) Prior Publication Data

US 2009/0110076 A1    Apr. 30, 2009

(51) Int. Cl.
*H04N 11/02* (2006.01)
(52) U.S. Cl. ............................... 375/240.16; 375/240.22
(58) Field of Classification Search .................. None
See application file for complete search history.

(56) References Cited

U.S. PATENT DOCUMENTS

| 5,900,910 A * | 5/1999 | Hirabayashi et al. ...... 348/394.1 |
| 2002/0093588 A1* | 7/2002 | Dantwala et al. ............ 348/459 |
| 2003/0012280 A1* | 1/2003 | Chan ........................ 375/240.16 |
| 2003/0223619 A1* | 12/2003 | Stocker et al. ................ 382/107 |
| 2005/0129274 A1* | 6/2005 | Farmer et al. ................. 382/103 |
| 2005/0275727 A1* | 12/2005 | Lai et al. ..................... 348/208.1 |
| 2006/0067406 A1* | 3/2006 | Kitada et al. ............. 375/240.16 |

* cited by examiner

*Primary Examiner* — Chirag Shah
*Assistant Examiner* — Salvador E Rivas
(74) *Attorney, Agent, or Firm* — Thomas, Kayden, Horstemeyer & Risley LLP.

(57) ABSTRACT

Certain aspects of a method and system for optical flow based motion vector estimation for picture rate up-conversion (PRUC) may include generating one or more motion vectors based on extracted picture rate up-conversion (PRUC) data by minimizing a cost function. The cost function may be constrained by any combination of a block matching constraint, a smoothness constraint and a bias constraint. The PRUC data may be extracted from a compressed video data stream while the compressed video data stream is being decompressed by a video decompression engine. The PRUC data may comprise local block motion vectors, block coding modes, quantization levels, quantized residual data and decoded pictures. A plurality of interpolated pictures may be generated based on extracting the PRUC data.

18 Claims, 12 Drawing Sheets

METHOD AND SYSTEM FOR OPTICAL FLOW BASED MOTION VECTOR ESTIMATION FOR PICTURE RATE UP-CONVERSION

CROSS-REFERENCE TO RELATED APPLICATIONS/INCORPORATION BY REFERENCE

None

FIELD OF THE INVENTION

Certain embodiments of the invention relate to digital video processing. More specifically, certain embodiments of the invention relate to a method and system for optical flow based motion vector estimation for picture rate up-conversion (PRUC).

BACKGROUND OF THE INVENTION

A major revolution in video display technology includes flat screens based on either liquid crystal display (LCD) or plasma display panel (PDP) technology that are rapidly replacing the cathode ray tube (CRT) technology that served as the primary display device for more than a half a century. A significant consequence of the new video display technologies is that pictures may now be displayed at higher picture-rates with progressive scanning on a flat screen. The new video display technologies may also facilitate a faster transition from standard definition television (SDTV) to high-definition television (HDTV). However, legacy video compression systems still use formats with lower picture-rates and may be unable to optimally display legacy video on modern display screens.

There may be restrictions on channel capacity that may affect the display of low picture-rate pictures. For example, considering a 30 Hz video sequence that may be broadcast over a mobile network, the terminals, for example, mobile phones may receive an encoded video sequence from a server. However, due to bandwidth limitations, only a low bit-rate video sequence may be communicated. As a result, the encoder may remove two out of every three pictures to be transmitted, resulting in a sequence with a picture rate of about 10 Hz, for example. The terminal may be capable of displaying video at 30 Hz but since it receives a 10 Hz video, it may have to perform some form of picture-rate conversion.

The picture rate up-conversion (PRUC) process may interpolate additional intermediate pictures between received pictures instead of repeating earlier received pictures. For motion-compensated PRUC, the interpolation process may be similar to the predicted pictures, for example, P-pictures and B-pictures in a video compression algorithm. However, in some cases, PRUC data comprising motion vector and residual data may not be transmitted. The display devices may perform PRUC utilizing their own motion estimation and motion compensation algorithms, which may not be able to handle a plurality of picture rates of received pictures.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for optical flow based motion vector estimation for picture rate up-conversion (PRUC), substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a system and/or method for optical flow based motion vector estimation for picture rate up-conversion (PRUC). Certain aspects of a method may comprise generating one or more motion vectors based on extracted picture rate up-conversion (PRUC) data by minimizing a cost function. The cost function may be constrained by any combination of a block matching constraint, a smoothness constraint and a bias constraint. The PRUC data may be extracted from a compressed video data stream while the compressed video data stream is being decompressed by a video decompression engine. The PRUC data may comprise local block motion vectors, block coding modes, quantization levels, quantized residual data and decoded pictures. A plurality of interpolated pictures may be generated based on extracting the PRUC data.

Figure 1A:
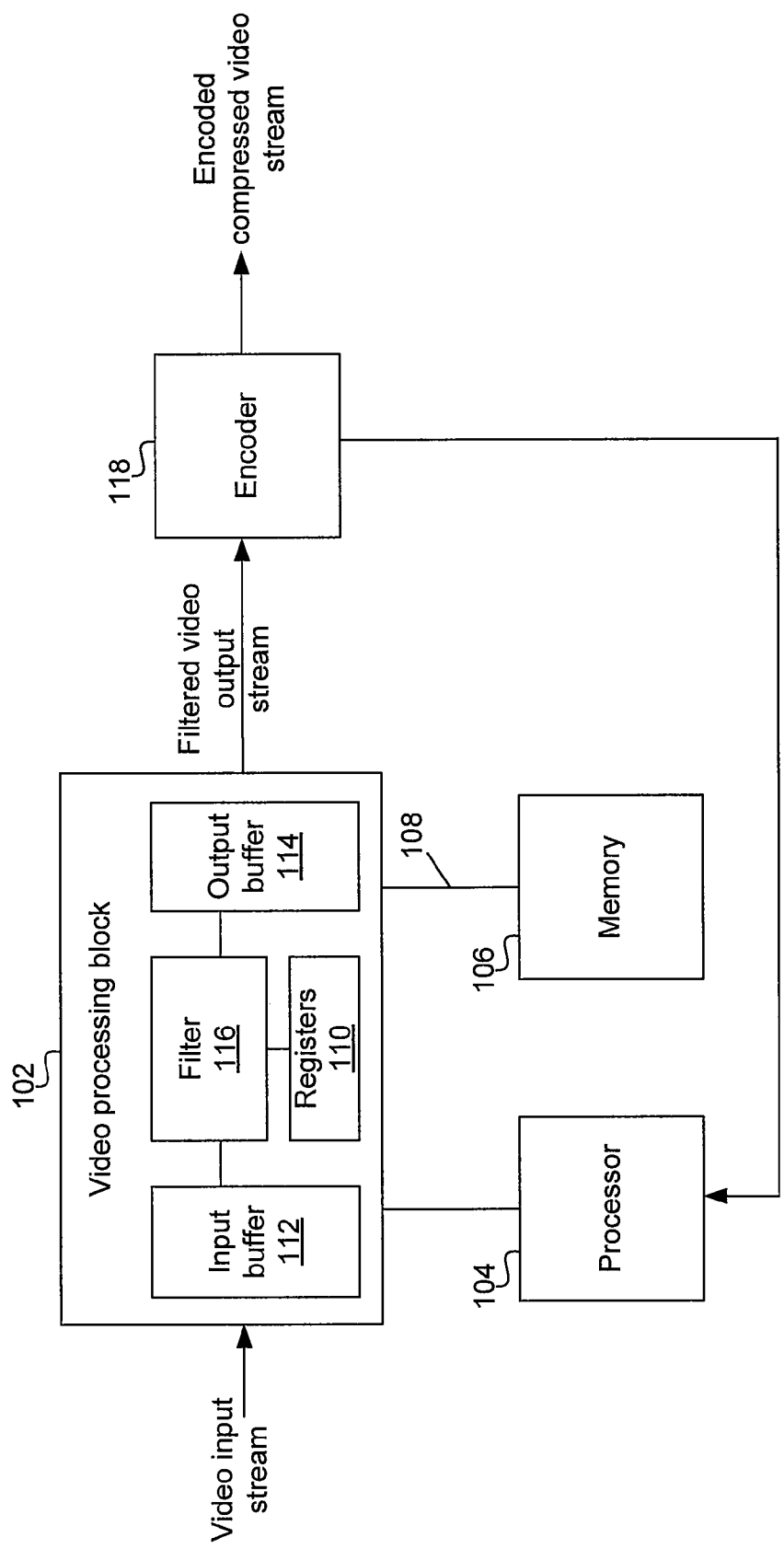
FIG. 1A is a block diagram of an exemplary video processing system, in accordance with an embodiment of the invention.

FIG. 1A is a block diagram of an exemplary video processing system, in accordance with an embodiment of the invention. Referring to FIG. 1A, there is shown a video processing block 102, a processor 104, a memory 106, an encoder 118 and a data/control bus 108. The video processing block 102 may comprise registers 110 and filter 116. In some instances, the video processing block 102 may also comprise an input buffer 112 and/or an output buffer 114. The video processing block 102 may comprise suitable logic, circuitry, and/or code that may be enabled to filter pixels in a video picture or a video picture from a video input stream to reduce noise. For example, video frame pictures may be utilized in video systems with progressive video signals while video field pictures may be utilized in video systems with interlaced video signals. Video fields may alternate parity between top fields and bottom fields. A top field and a bottom field in an interlaced system may be deinterlaced or combined to produce a video frame.

The video processing block 102 may be enabled to receive a video input stream and, in some instances, to buffer at least a portion of the received video input stream in the input buffer 112. In this regard, the input buffer 112 may comprise suitable logic, circuitry, and/or code that may be enabled to store at least a portion of the received video input stream. Similarly, the video processing block 102 may be enabled to generate a filtered video output stream to a video decoder and, in some instances, to buffer at least a portion of the generated filtered video output stream in the output buffer 114. In this regard, the output buffer 114 may comprise suitable logic, circuitry, and/or code that may be enabled to store at least a portion of the filtered video output stream.

The filter 116 in the video processing block 102 may comprise suitable logic, circuitry, and/or code that may be enabled to perform filtering operation with noise reduction on the current pixel. In this regard, the filter 116 may be enabled to operate in a plurality of filtering modes, where each filtering mode may be associated with one of a plurality of supported filtering operations. The filter 116 may utilize video content, filter coefficients, threshold levels, and/or constants to generate the filtered video output stream in accordance with the filtering mode selected. In this regard, the video processing block 102 may generate blending factors to be utilized with the appropriate filtering mode selected. The registers 110 in the video processing block 102 may comprise suitable logic, circuitry, and/or code that may be enabled to store information that corresponds to filter coefficients, threshold levels, and/or constants, for example. Moreover, the registers 110 may be enabled to store information that corresponds to a selected filtering mode.

The processor 104 may comprise suitable logic, circuitry, and/or code that may be enabled to process data and/or perform system control operations. The processor 104 may be enabled to control at least a portion of the operations of the video processing block 102. For example, the processor 104 may generate at least one signal to control the selection of the filtering mode in the video processing block 102. Moreover, the processor 104 may be enabled to program, update, and/or modify filter coefficients, threshold levels, and/or constants in at least a portion of the registers 110. For example, the processor 104 may generate at least one signal to retrieve stored filter coefficients, threshold levels, and/or constants that may be stored in the memory 106 and transfer the retrieved information to the registers 110 via the data/control bus 108.

The memory 106 may comprise suitable logic, circuitry, and/or code that may be enabled to store information that may be utilized by the video processing block 102 to reduce noise in the video input stream. The memory 106 may be enabled to store filter coefficients, threshold levels, and/or constants, for example, to be utilized by the video processing block 102.

The encoder 118 may be enabled to receive and process a plurality of statistical inputs from the processor 104 and the video processing block 102. The encoder 118 may be enabled to generate the encoded compressed video stream based on encoding the filtered video output stream.

In operation, the processor 104 may select a filtering mode of operation and may program the selected filtering mode into the registers 110 in the video processing block 102. Moreover, the processor 104 may program the appropriate values for the filter coefficients, threshold levels, and/or constants into the registers 110 in accordance with the selected filtering mode. The video processing block 102 may receive the video input stream and may filter pixels in a video picture in accordance with the selected filtering mode. In some instances, the video input stream may be stored in the input buffer 112 before processing. The video processing block 102 may generate the appropriate blending factors needed to perform the noise reduction filtering operation selected by the processor 104. The video processing block 102 may generate the filtered video output stream after performing the noise reduction filtering operation. In some instances, the filtered video output stream may be stored in the output buffer 114 before being transferred out of the video processing block 102.

The processor 104 may determine the mode of operation of various portions of the video processing block 102. For example, the processor 104 may configure data registers in the video processing block 102 to allow direct memory access (DMA) transfers of video data to the memory 106. The processor 104 may also communicate instructions to an image sensor to initiate capturing of images. The memory 106 may be used to store image data that may be processed and communicated by the processor 104. The memory 106 may also be used for storing code and/or data that may be used by the processor 104. The memory 106 may also be used to store data for other functionalities of the video processing block 102. For example, the memory 106 may store data corresponding to voice communication. The processor 104 may comprise a state machine that may enable determination of whether video data type is interlaced type or progressive type.

Figure 1B:
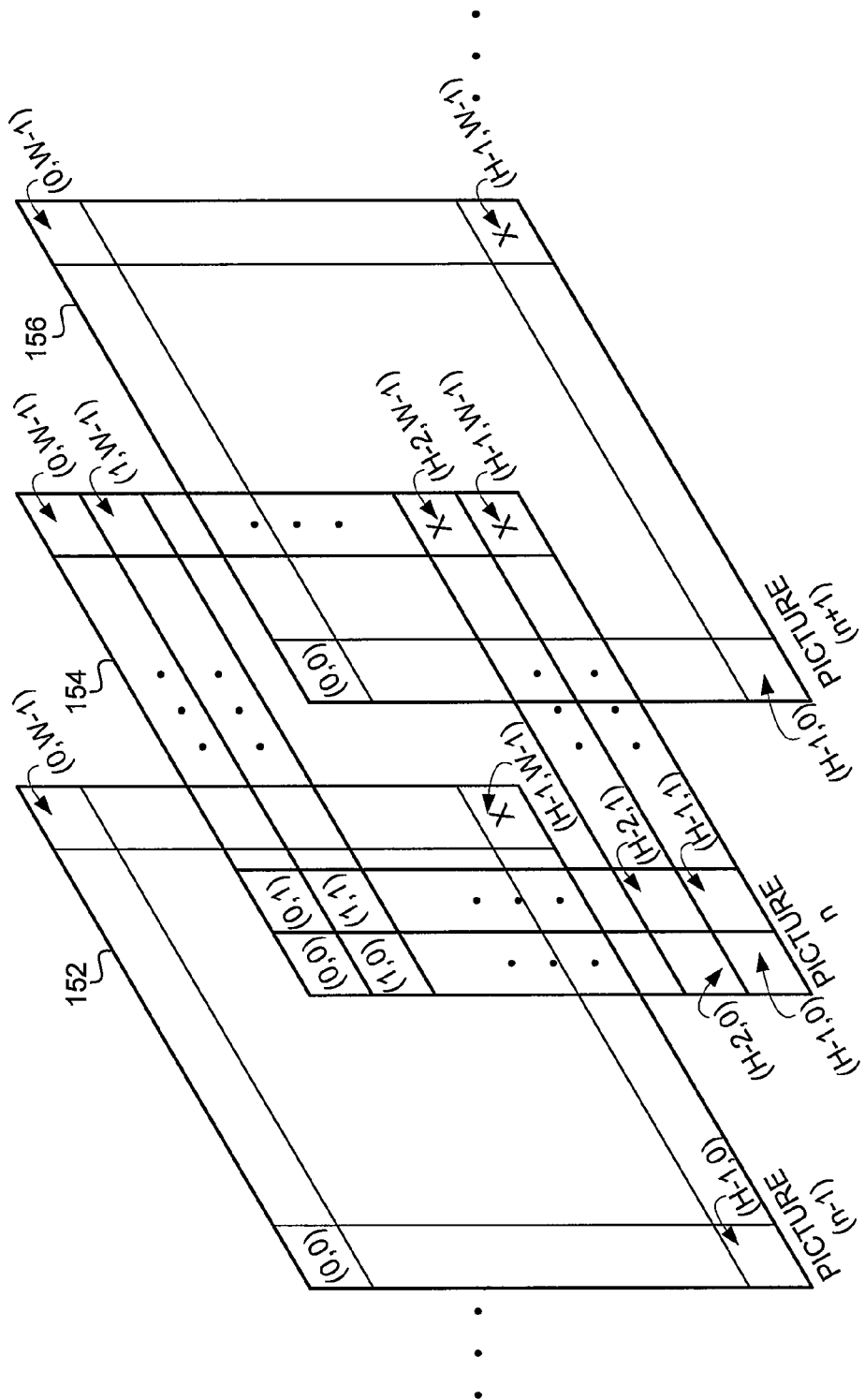
FIG. 1B is a diagram illustrating exemplary consecutive video pictures for noise reduction operations, in connection with an embodiment of the invention.

FIG. 1B is a diagram illustrating exemplary consecutive video pictures for noise reduction operations, in connection with an embodiment of the invention. Referring to FIG. 1B, there is shown a current video picture 154, a previous video picture 152, and a next video picture 156. The current video picture 154 or PICTURE n may correspond to a current picture being processed by the video processing block 102 in FIG. 1A. The previous video picture 152 or PICTURE (n−1) may correspond to an immediately previous picture to the current video picture 154. The next video picture 156 or PICTURE (n+1) may correspond to an immediately next picture to the current video picture 154. The previous video picture 152, the current video picture 154, and/or the next video picture 156 may be processed directly from the video input stream or after being buffered in the video processing block 102, for example. The current video picture 154, the previous video picture 152, and the next video picture 156 may comprise luma (Y) and/or chroma (Cb, Cr) information. In instances where video fields are utilized as pictures, the previous video picture 152 may refer to the previous field of the same parity as the current video picture 154, and the next video picture 156 may refer to the next field of the same parity as the current picture 154. The previous, current and next video fields of the same parity may be referred to as consecutive video pictures.

Pixels in consecutive video pictures are said to be collocated when having the same picture location, that is, . . . , $P_{n-1}(x,y), P_n(x,y), P_{n+1}(x,y), \ldots$, where $P_{n-1}$ indicates a pixel value in the previous video picture 152, $P_n$ indicates a pixel value in the current video picture 154, $P_{n+1}$ indicates a pixel value in the next video picture 156, and (x,y) is the common picture location between pixels. The picture location, (x,y) may be such that $x=0, 1, \ldots, W-1$ and $y=0, 1, \ldots, H-1$, where W is the picture width and H is the picture height, for example.

Operations of the video processing block 102 in FIG. 1A need not be limited to the use of exemplary consecutive video pictures as illustrated in FIG. 1B. For example, the video processing block 102 may perform filtering operations on consecutive video fields of the same parity, that is, on consecutive top fields or consecutive bottom fields. When performing noise reduction operations on consecutive video fields of the same parity, pixels in the video processing block 102 are said to be collocated when having the same picture location, that is, . . . , $P_{n-1}(x,y), P_n(x,y), P_{n+1}(x,y), \ldots$, where $P_{n-1}$ indicates a pixel value in a previous video field, $P_n$ indicates a pixel value in a current video field, $P_{n+1}$ indicates a pixel value in a next video field, and (x,y) is the common picture location between pixels.

Figure 2:
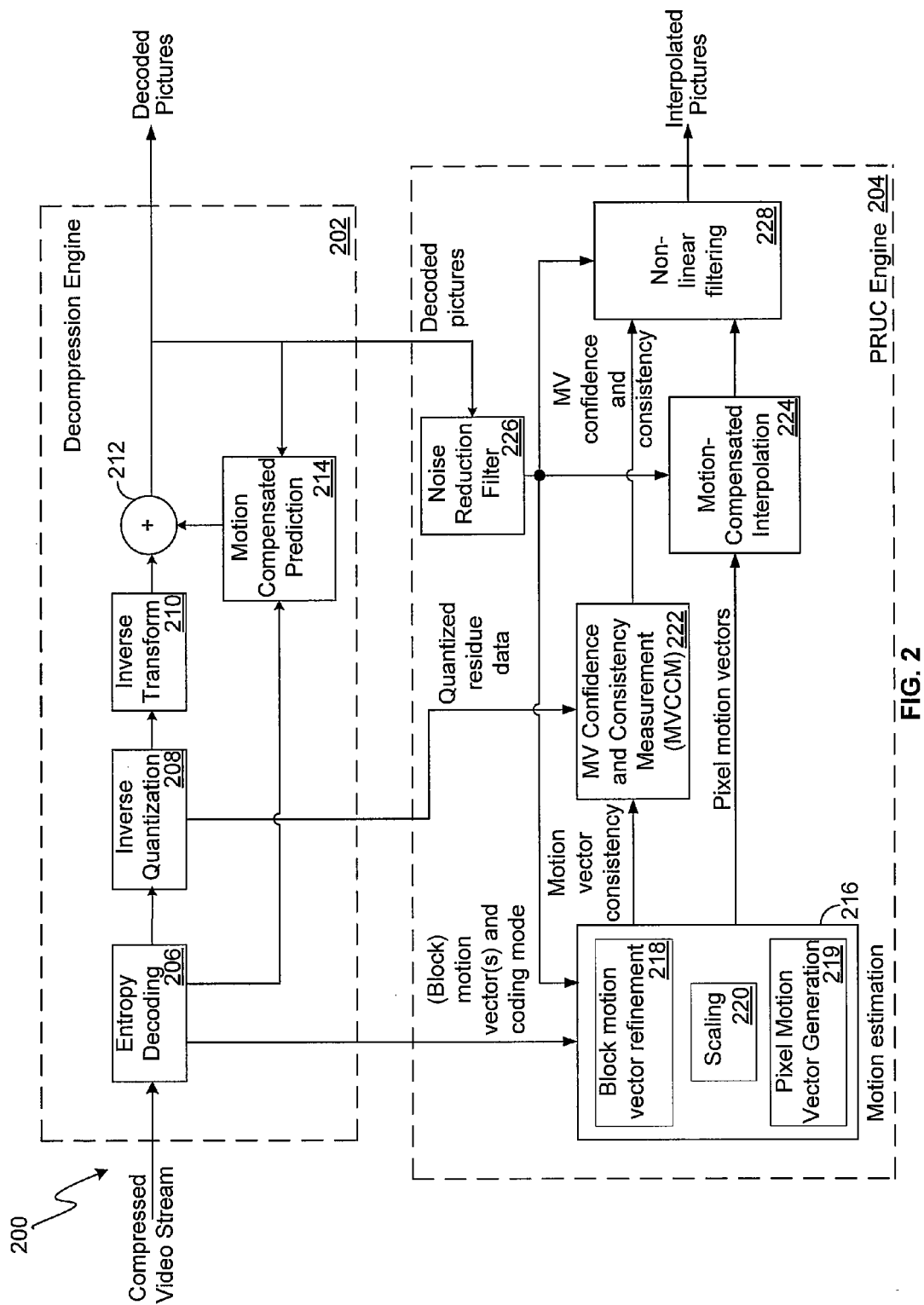
FIG. 2 is a block diagram of an exemplary picture rate up-conversion system, in accordance with an embodiment of the invention.

FIG. 2 is a block diagram of an exemplary picture rate up-conversion system, in accordance with an embodiment of the invention. Referring to FIG. 2, there is shown a video decoding system 200. The video decoding system 200 may comprise a decompression engine 202 and a picture rate up-conversion (PRUC) engine 204. The decompression engine 202 may comprise an entropy decoder 206, an inverse quantization block 208, an inverse transform block 210, a summer 212 and a motion compensated prediction block 214.

The PRUC engine 204 may comprise a motion estimation block 216, a motion vector confidence and consistency measurement (MVCCM) block 222, a motion compensated interpolation block 224, a noise reduction filter 226 and a non-linear filtering block 228. The motion estimation block 216 may comprise a block motion vector refinement block 218, a scaling block 220 and a pixel motion vector generation block 219.

The decompression engine 202 may be a video decoder associated with a particular video standard, for example, MPEG-2, H.264/MPEG-4 AVC, VC1 and VP6. The entropy decoder 206 may comprise suitable logic, circuitry and/or code that may be enabled to receive a compressed video stream from a video encoder, for example, encoder 118. The entropy decoder 206 may be enabled to decode the received compressed video stream corresponding to a particular video standard, for example, MPEG-2, H.264/MPEG-4 AVC, VC1 and VP6. The entropy decoder 206 may be enabled to generate block motion vectors based on decoding the received compressed video stream.

The inverse quantization block 208 may comprise suitable logic, circuitry and/or code that may be enabled to generate quantized residue data. The inverse transform block 210 may comprise suitable logic, circuitry and/or code that may be enabled to generate reconstructed residual pixels to the summer 212.

The motion compensated prediction block 214 may comprise suitable logic, circuitry and/or code that may be enabled to receive one or more motion vectors from the entropy decoder 206 to generate a motion compensated block of pixels. The summer 212 may be enabled to add the motion compensated block of pixels to the reconstructed residual pixels to generate one or more decoded pictures. One or more decoded pictures may be fed back to the motion compensated prediction block 214. The motion compensated prediction block 214 may be enabled to generate the motion compensated block of pixels from a reference image or a previous output picture based on receiving one or more motion vectors from the entropy decoder 206.

The PRUC engine 204 may be enabled to extract information, for example, motion vectors, picture and macroblock coding types and quantized residue data from the video decompression engine 202.

The noise reduction filter 226 may comprise suitable logic, circuitry and/or code that may be enabled to receive a plurality of decoded pictures from the decompression engine 202. The noise reduction filter 226 may be enabled to perform de-blocking, de-ringing, or other noise reduction filtering on the received decoded pictures. The noise reduction filter 226 may generate a filtered output to the pixel motion vector generation block 216, the motion compensated interpolation block 224 and the non-linear filtering block 228.

Blockiness artifact may be caused by distorting the distribution or spectrum of the block transform domain by a quantizer. The blockiness artifact may be related to a lower spectrum coefficient or frequency distortion by the quantization. The blockiness artifact may be visible on the block boundaries, for example, 8×8 pixels for MPEG 1, 2 and 4 and both 4×4 pixels and 8×8 pixels for MPEG4 part10 AVC, for example. The blockiness artifact may be perceived in flat texture areas in a given picture or video, for example.

The ringing encoding artifact may be also referred to as a mosquito artifact and may be caused by distorting the distribution and/or spectrum of the block transform domain, by a quantizer. The ringing encoding artifact may be related to a higher spectrum coefficient or frequency distortion by the quantization. The ringing encoding artifact may be visible on edges or text boundaries with a flat texture area, for example.

The motion estimation block 216 may comprise suitable logic, circuitry and/or code that may be enabled to receive extracted block motion vectors and coding modes from the entropy decoder 206. The motion estimation block 216 may be enabled to determine local block motion vectors and a global motion vector and determine the interpolation and filtering modes. The motion estimation block 216 may be enabled to accumulate the plurality of block motion vectors in order to estimate a global motion vector (GMV). The motion estimation block 216 may be enabled to sort motion vectors into a histogram and generate the GMV.

The block motion vector refinement block 218 may comprise suitable logic, circuitry and/or code that may be enabled to refine the motion vectors extracted from the compressed video stream and decompose the block motion vectors into pixel motion vectors. The block motion vector refinement block 218 may be enabled to perform a local refinement search and the motion vectors may be refined to sub-pixel precision, for example.

The scaling block 220 may comprise suitable logic, circuitry and/or code that may be enabled to scale the generated motion vectors for interpolated or inserted pictures. The pixel motion vector generation block 219 may be enabled to generate pixel motion vectors, for example, using a local adaptive non-linear filter. The motion estimation block 216 may be enabled to measure the local motion vector consistency value.

The MVCCM block 222 may comprise suitable logic, circuitry and/or code that may be enabled to measure the extracted quantized residue data and the quantization level. The MVCCM block 222 may be enabled to generate a motion vector consistency value by comparing adjacent block motion vectors and motion-compensated block boundary pixel differences. For example, smaller quantization levels with less residue data may result in higher motion vector confidence while larger quantization levels and higher residue data may generate lower motion vector confidence. The MVCCM block 222 may be enabled to generate a motion vector confidence value and a motion vector consistency value to the non-linear filtering block 228.

The motion compensated interpolation block 224 may comprise suitable logic, circuitry and/or code that may be enabled to utilize the scaled local and global motion vectors and the noise reduced decoded pictures to generate the interpolated or inserted pictures. The motion compensated interpolation block 224 may be enabled to pass the generated interpolated pictures to the non-linear filtering block 228.

The non-linear filtering block 228 may comprise suitable logic, circuitry and/or code that may be enabled to filter the received interpolated pictures to reduce artifacts in the final output interpolated pictures. The non-linear filtering block 228 may be enabled to utilize the motion vector confidence and consistency measurement value to determine whether motion compensated interpolation is likely to fail. If the non-linear filtering block 228 determines that the motion compensated interpolation is likely to fail, the PRUC engine 204 may be enabled to switch off picture interpolation across scene changes and continue repeating previous pictures.

In operation, the decompression engine 202 may be enabled to receive compressed video streams comprising low picture rates and decompress the received compressed video streams. The PRUC engine 204 may be enabled to perform PRUC using motion vectors and other coding information extracted from the compressed video streams. The PRUC engine 204 may be enabled to generate high picture rate interpolated pictures in progressive scanning for display on a modern video display screen, for example, LCD screen or PDP screen.

Digital video compression algorithms, for example, MPEG-2, MPEG-4, VC1 and VP6 may allow forward and backward predictive and bidirectional predictive coding that may result in the generation of P and B pictures respectively. Motion compensated predictive coding may be enabled to exploit the temporal correlation between consecutive pictures. The video compression encoder 118 may generate motion vectors (MV) between pictures within an allowed temporal window. These motion vectors may be utilized for motion compensation in video compression encoding and decoding processes. In the compressed video stream, the motion compensated information, for example, macroblocks may comprise coded motion vector data and transformed residual data.

An artifact known as motion judder may result when the picture rate of a video stream is low. Motion judder may be due to the temporal sampling rate being too low to accurately describe motion in a scene. The motion compensated interpolation block 224 may be enabled to reduce motion judder. The motion compensated interpolation block 224 may be enabled to modify the processing of a picture rate converter so that it may follow moving objects similar to the human eye. The picture may appear clean and sharp as it moves without the motion judder. The PRUC engine 204 may be enabled to analyze a stream of input pictures to identify each object in the scene to determine how the object may be moving. The PRUC engine 204 may be enabled to interpolate the location of the plurality of objects at different time instants to generate each output picture.

The PRUC engine 204 may be enabled to interpolate additional intermediate pictures between coded pictures instead of repeating earlier coded pictures. Motion compensated interpolation may be similar to the generation of predicted pictures, for example, P pictures and B pictures during video compression. In accordance with an embodiment of the invention, the PRUC engine 204 may not require the transmission of motion vector and residual data to generate one or more interpolated pictures. One or more display devices may perform their own PRUC from the compressed video stream with no additional information other than receiving decoded pictures.

A plurality of interpolated motion vectors may be utilized for isolated macroblocks without motion vectors, for example, intra macroblocks. In accordance with an embodiment of the invention, the PRUC engine 204 may be enabled to switch-off frame interpolation across scene changes and repeat the previous frame. The non-linear filtering block 228 may be enabled to utilize motion adaptive weighted median filtering, for example, to generate interpolated pictures between an I picture and a previous P picture.

Figure 3A:
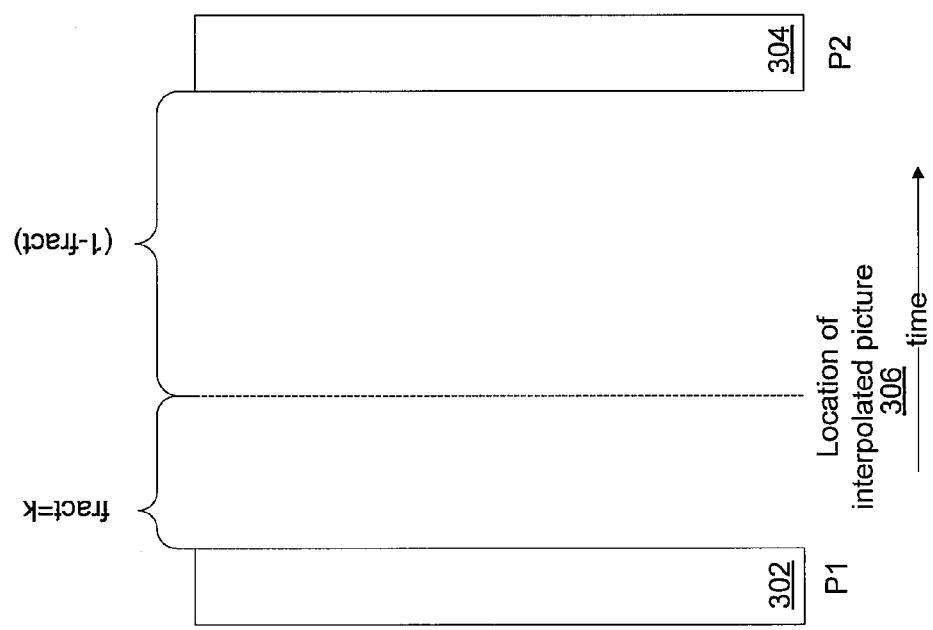
FIG. 3A is a block diagram illustrating insertion of an exemplary interpolated picture between two pictures, in accordance with an embodiment of the invention.

FIG. 3A is a block diagram illustrating insertion of an exemplary interpolated picture between two pictures, in accordance with an embodiment of the invention. Referring to FIG. 3A, there is shown a plurality of coded pictures, for example, P1 302 and P2 304 and the location of an interpolated picture 306. For example, the interpolated picture 306 may be inserted k time units from the coded picture P1 302.

Figure 3B:
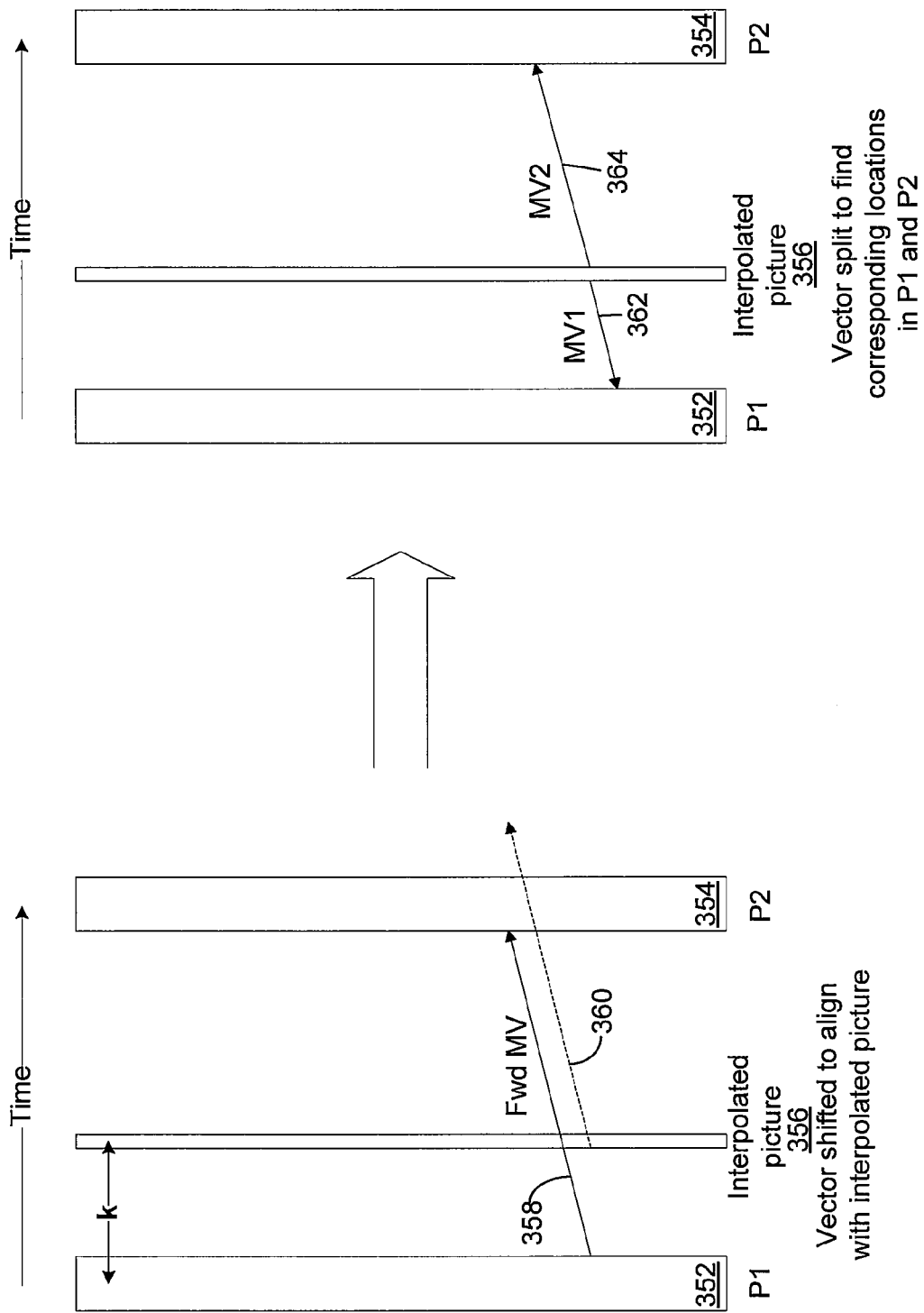
FIG. 3B is a block diagram illustrating exemplary motion vectors of an interpolated picture, in accordance with an embodiment of the invention.

FIG. 3B is a block diagram illustrating exemplary motion vectors of an interpolated picture, in accordance with an embodiment of the invention. Referring to FIG. 3B, there is shown a plurality of coded pictures, for example, P1 352 and P2 354 and an interpolated picture 356. For example, the interpolated picture 356 may be inserted k time units from the coded picture P1 352.

A motion vector 358 may point from an area in the previous picture P1 352 to an area in the next picture P2 354, in such a way that the motion vector 358 may capture the motion that occurred between the two original pictures P1 352 and P2 354. The motion vector 360 may be a shifted version of motion vector 358. The motion vector 360 may be shifted to align with the interpolated picture 356.

The motion vector 360 may be split into two motion vectors, for example, MV1 362 and MV2 364. Each of the estimated motion vectors, for example, motion vector 360 may be split and scaled for motion compensated interpolation. The directions of the two scaled motion vectors, for example, MV1 362 and MV2 364 may be opposite to each other. The length of the scaled motion vector, for example, MV1 362 may be proportional to the temporal difference between the interpolated picture 356 and the original picture P1 352. The length of the scaled motion vector, for example, MV2 364 may be proportional to the temporal difference between the interpolated picture 356 and the original picture P2 354.

In accordance with an embodiment of the invention, the motion estimation block 216 may be enabled to search an optimal optical flow estimate based on a visual observation, a matching and flow model, and additional input from higher cognitive levels. These inputs and models may impose individual constraints on the optimization solution. A first constraint may comprise a minimum displacement or a block matching constraint. The displacement per time unit in image space may serve as a measure for image motion. The matching method may be described by a least-squares error operation as illustrated equation (1.1):

$$E(x,y,t;v_x,v_y,\Delta t)=(P(x,y,t)-P(x+v_x,y+v_y,t+\Delta t))^2, \quad (1.1)$$

where P may describe a brightness distribution in an image space and time on a cartesian coordinate system, $v_x$ and $v_y$ may indicate translational displacements and may also be referred to as motion vectors in image space. The motion vectors, $v^t_x$ and $v^t_y$ at t for a given $\Delta t$ may be derived such that $E(x, y, t; v^t_x, v^t_y, \Delta t)$ is minimal, hence $$\bar{v}^t=(v^t_x,v^t_y)=\arg\min_{v_x,v_y} E(x,y,t;v_x,v_y,\Delta t). \quad (1.2)$$

The instantaneous estimate of an optical flow in the image space may be its vector field, for example, $$\bar{v}_t(x, y, t) = \left(\frac{dv^t_x}{dt}, \frac{dv^t_y}{dt}\right).$$

The Taylor expansion of P(x, y, t) may lead to $$P(x + v_x, y + v_y, t + \Delta t) = P(x, y, t) + \frac{\partial P}{\partial x}v_x \frac{\partial P}{\partial y}v_y + \frac{\partial P}{\partial t}\Delta t + \varepsilon(o^2) \quad (1.3)$$

where $\epsilon(o^2)$ may comprise higher order terms that may be neglected. The block matching constraint may be represented according to equation (1.4):

$$E(x, y, t; v_x, v_y, \Delta t) = \left(\frac{\partial P}{\partial x}v_x \frac{\partial P}{\partial y}v_y + \frac{\partial P}{\partial t}\Delta t\right)^2, \quad (1.4)$$

where $\partial P/\partial x$, $\partial P/\partial y$ comprise partial derivatives of P in the image space (x,y), and $\partial P/\partial t$ comprises a partial derivative of P in time t.

The PRUC engine 204 may impose a plurality of assumptions regarding the properties of an expected optical flow. For example, one assumption may be that the optical flow estimate is smooth. The smoothness constraint may be defined as a quadratic measure of how much a flow field may vary across the image space and may be represented according to equation (1.5):

$$S(\bar{v}) = \left(\frac{\partial v_x}{\partial x}\right)^2 + \left(\frac{\partial v_x}{\partial y}\right)^2 + \left(\frac{\partial v_y}{\partial x}\right)^2 + \left(\frac{\partial v_y}{\partial y}\right)^2 + \left(\frac{\partial v_x}{\partial t}\right)^2 + \left(\frac{\partial v_y}{\partial t}\right)^2 \quad (1.5)$$

The smoothness of optical flow may assume that locations in an image close to each other may be more likely to belong to the same moving region, and more likely to have the same visual motion. Smoothness may be related to the motion field of rigid objects, for example, for scenes that comprise motion judder. The smoothness constraints may be violated at the locations where motion discontinuities are likely to occur, for example, moving object boundaries.

Another assumption of the optical flow model may be that a plurality of optical flow vectors may be derived from a known reference motion vector and may be referred to as a bias constraint. The bias constraint may be defined according to equation (1.6):

$$B(\bar{v},\bar{v}_{ref})=(v_x-v_{x_{ref}})^2+(v_y-v_{y_{ref}})^2, \quad (1.6)$$

The bias constraint may measure how much the estimated optical flow vector deviates from a given reference motion $\bar{v}_{ref}=(v_{x_{ref}},v_{y_{ref}})$. The bias constraint may permit the PRUC engine 204 to incorporate and apply apriori information regarding the expected motion, for example, the global motion vector. In another embodiment of the invention, the reference motion vector may be a regional dominant motion vector. The reference motion vector $\bar{v}_{ref}=(v_{x_{ref}},v_{y_{ref}})$ may specify an optical flow estimate under conditions where the visual input may be ambiguous and unreliable. The bias constraint may be utilized to adapt the PRUC engine 204 to different visual conditions. The bias constraint may incorporate such additional knowledge which may lead to a better estimate of visual motion.

The plurality of constraints, for example, block matching constraint, smoothness constraint and bias constraint may be combined to formulate an optimization problem. For a continuous input of brightness distribution P(x,y,t) on an image region $\Omega \subset R^2$, the motion vectors, $v_x$ and $v_y$ may be determined for a given time duration $\Delta t$ such that a cost function $$J(\bar{v}, w_S, w_B) = \int_\Omega (E + w_S \cdot S + w_B \cdot B)d\Omega \quad (1.7)$$

is minimal, with $\bar{v}''=\bar{0}$ along $\partial\Omega$ and $w_S>°$, and $w_B \geq 0$ The relative weights of the smoothness and bias constraints may be set by parameters $w_S$ and $w_B$ respectively. At a first initialization, the parameters $w_S$ and $w_B$ may be assumed to be constant. However, the parameters $w_S$ and $w_B$ may be considered as a function of time, location, and a current motion estimation and permit the computational behavior to be altered. The weighting parameters $w_S$ and $w_B$ and reference motion vector may be utilized to program the PRUC 204 in order to account for different models of visual motion perception.

The motion estimation formulated as a constraint optimization problem in equation (1.7) may have a unique solution depending on the continuity of the input data under a plurality of visual input conditions.

Figure 4A:
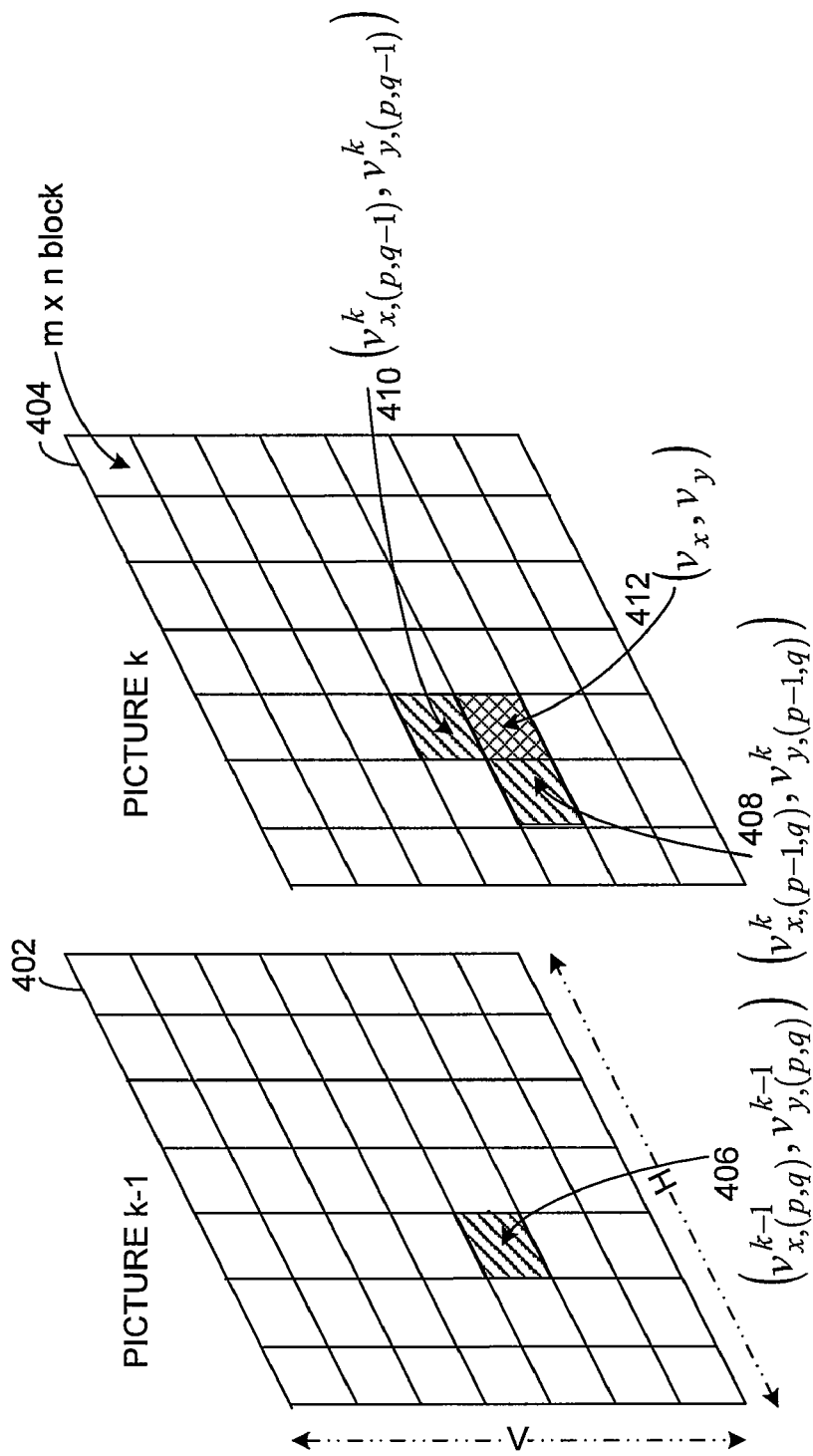
FIG. 4A is a block diagram illustrating an exemplary image lattice and corresponding motion vectors locations, in accordance with an embodiment of the invention.

FIG. 4A is a block diagram illustrating an exemplary image lattice and corresponding motion vectors locations, in accordance with an embodiment of the invention. Referring to FIG. 4A, there is shown a previous picture, picture k−1 402 and a current picture, picture k 404.

The constraint optimization problem illustrated in equation (1.7) may be formulated on a continuous image space $\Omega \subset R^2$. However, the video data may be provided by an imaging device as discrete temporal pictures with discrete spatial resolution. A discrete image space defined on an orthogonal lattice may be considered, where each node may be labeled by two integer values $i \in [0, 1, \ldots, H-1]$ and $j \in [0, 1, \ldots, V-1]$. On this discrete space, the constraint optimization problem illustrated in equation (1.7) may be reduced to a finite number of locations. The (i,j) lattice may be partitioned into p×q blocks to model the cost function for implementation, where each block may have a size of m×n, or $i \in [pm, \ldots, pm+m-1]$ where $$p \in \left[0, 1, \ldots, \left\lfloor\frac{H}{m}\right\rfloor - 1\right],$$

and j∈[qn, ..., qn+n−1] where $$q \in \left[0, 1, \ldots, \left\lfloor \frac{V}{n} \right\rfloor - 1\right].$$

For each m×n block a single motion vector may be determined. There may be p×q motion vectors in an image space. The estimation of an optical flow motion vector may be modeled as a causal discrete constraint optimization process with the cost function for the block (p,q) as illustrated in equation (2.1):

$$J(\bar{v}, w_S, w_B) = \tag{2.1}$$

$$\sum_{i=pm}^{pm+m-1} \sum_{j=qn}^{qn+n-1} (P(x_i, y_j, k) - P(x_i + v_x, y_j + v_y, k-1))^2 +$$

$$w_S \cdot \left((v_x - v_{x,(p-1,q)}^k)^2 + (v_y - v_{y,(p-1,q)}^k)^2 + (v_x - v_{x,(p,q-1)}^k)^2 + (v_y - v_{y,(p,q-1)}^k)^2 + (v_x - v_{x,(p,q)}^{k-1})^2 + (v_y - v_{y,(p,q)}^{k-1})^2\right) +$$

$$w_B \cdot \left((v_x - v_{x_{ref}})^2 + (v_y - v_{y_{ref}})^2\right)$$

where the partial derivatives of flow vectors in the smoothness term in equation (1.7) may be replaced by a difference operator and the index k may denote the picture number. The $v_{b,(c,d)}^a$ may denote the previously estimated motion vector in a picture a for the b direction and at a grid location (c,d). Notwithstanding, there may be a plurality of variations for implementing equation (2.1) and the smoothness term with $v_{b,(c,d)}^a$ may be altered for implementation.

For example, referring to FIG. 4A, the motion vector for block 406 may be represented as $(v_{x,(p,q)}^{k-1}, v_{y,(p,q)}^{k-1})$. The motion vectors for blocks 408 and 410 may be represented as $(v_{x,(p-1,q)}^k, v_{y,(p-1,q)}^k)$ and $(v_{x,(p,q-1)}^k, v_{y,(p,q-1)}^k)$ respectively. The motion vector for block 412 $(v_x, v_y)$ may be estimated based on the motion vectors for blocks 406, 408 and 410. In accordance with an embodiment of the invention, a block matching motion-estimation algorithm may be utilized to minimize the cost function illustrated in equation (2.1).

Figure 4B:
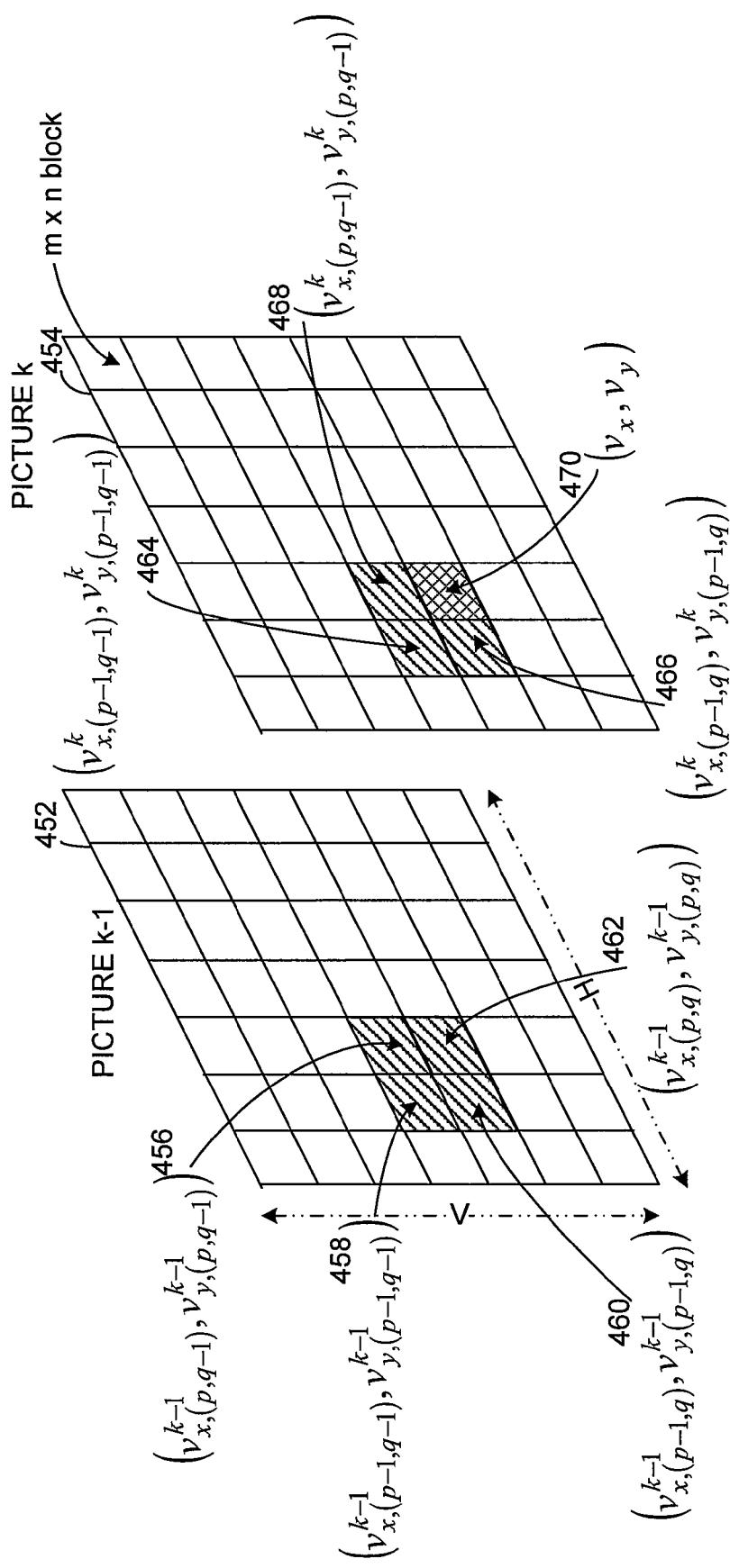
FIG. 4B is a block diagram illustrating an alternative embodiment of an exemplary image lattice and corresponding motion vectors locations, in accordance with an embodiment of the invention.

FIG. 4B is a block diagram illustrating an alternative embodiment of an exemplary image lattice and corresponding motion vectors locations, in accordance with an embodiment of the invention. Referring to FIG. 4B, there is shown a previous picture, picture k−1 452 and a current picture, picture k 454.

The constraint optimization problem illustrated in equation (1.7) may be formulated on a continuous image space $\Omega \subset \mathbb{R}^2$. However, the video data may be provided by an imaging device as discrete temporal pictures with discrete spatial resolution. A discrete image space defined on an orthogonal lattice may be considered, where each node may be labeled by two integer values i∈[0, 1, ..., H−1] and j∈[0, 1, ..., V−1]. On this discrete space, the constraint optimization problem illustrated in equation (1.7) may be reduced to a finite number of locations. The (i,j) lattice may be partitioned into p×q blocks to model the cost function for implementation, where each block may have a size of m×n or i∈[pm, ..., pm+m−1] where $$p \in \left[0, 1, \ldots, \left\lfloor \frac{H}{m} \right\rfloor - 1\right],$$

and j∈[qn, ..., qn+n−1] where $$q \in \left[0, 1, \ldots, \left\lfloor \frac{V}{n} \right\rfloor - 1\right].$$

For each m×n block a single motion vector may be determined. There may be p×q motion vectors in an image space. The estimation of an optical flow motion vector may be modeled as a causal discrete constraint optimization process with the cost function for the block (p,q) as illustrated in equation (2.1 a):

$$J(\bar{v}, w_S, w_B; k) = \tag{2.1a}$$

$$\sum_{i=pm}^{pm+m-1} \sum_{j=qn}^{qn+n-1} (P(i, j_j, k) - P(i + v_x, j + v_y, k-1))^2 +$$

$$w_S \cdot \left(\frac{1}{16}(v_x - \bar{v}_x^{(x)})^2 + \frac{1}{16}(v_x - \bar{v}_x^{(y)})^2 + \frac{1}{16}(v_y - \bar{v}_y^{(x)})^2 + \frac{1}{16}(v_y - \bar{v}_y^{(y)})^2\right) + w_B \cdot \left((v_x - v_{x_{ref}})^2 + (v_y - v_{y_{ref}})^2\right)$$

where the partial derivatives of flow vectors in the smoothness term in equation (1.7) may be replaced by a causal difference operator:

$$\frac{\partial v_x}{\partial x} \approx \frac{1}{4}(v_x - \bar{v}_x^{(x)}), \tag{2.1b}$$

$$\bar{v}_x^{(x)} = v_{x,(p-1,q)}^k - v_{x,(p,q-1)}^k + v_{x,(p-1,q-1)}^k - v_{x,(p,q)}^{k-1} + v_{x,(p-1,q)}^{k-1} - v_{x,(p,q-1)}^{k-1} + v_{x,(p-1,q-1)}^{k-1}$$

$$\frac{\partial v_x}{\partial y} \approx \frac{1}{4}(v_x - \bar{v}_x^{(y)}),$$

$$\bar{v}_x^{(y)} = v_{x,(p,q-1)}^k - v_{x,(p-1,q)}^k + v_{x,(p-1,q-1)}^k - v_{x,(p,q)}^{k-1} + v_{x,(p,q-1)}^{k-1} - v_{x,(p-1,q)}^{k-1} + v_{x,(p-1,q-1)}^{k-1}$$

$$\frac{\partial v_y}{\partial x} \approx \frac{1}{4}(v_y - \bar{v}_y^{(x)}),$$

$$\bar{v}_y^{(x)} = v_{y,(p-1,q)}^k - v_{y,(p,q-1)}^k + v_{y,(p-1,q-1)}^k - v_{y,(p,q)}^{k-1} + v_{y,(p-1,q)}^{k-1} - v_{y,(p,q-1)}^{k-1} + v_{y,(p-1,q-1)}^{k-1}$$

$$\frac{\partial v_y}{\partial y} \approx \frac{1}{4}(v_y - \bar{v}_y^{(y)}),$$

$$\bar{v}_y^{(y)} = v_{y,(p,q-1)}^k - v_{y,(p-1,q)}^k + v_{y,(p-1,q-1)}^k - v_{y,(p,q)}^{k-1} + v_{y,(p,q-1)}^{k-1} - v_{y,(p-1,q)}^{k-1} + v_{y,(p-1,q-1)}^{k-1}$$

and the index k may denote the picture number, Δt=k−(k−1)=1. The $v_{b,(c,d)}^a$ may denote a previously estimated motion vector in a picture a for the b direction and at a grid location (c,d). Notwithstanding, there may be a plurality of variations for implementing equation (2.1 a) and the smoothness term with $v_{b,(c,d)}^a$ may be altered for implementation.

For example, referring to FIG. 4B, the motion vector for blocks 456, 458, 460 and 462 may be represented as $(v_{x,(p,q-1)}^{k-1}, v_{y,(p,q-1)}^{k-1})$, $(v_{x,(p-1,q-1)}^{k-1}, v_{y,(p-1,q-1)}^{k-1})$, $(v_{x,(p-1,q)}^{k-1}, v_{y,(p-1,q)}^{k-1})$ and $(v_{x,(p,q)}^{k-1}, v_{y,(p,q)}^{k-1})$ respectively. The motion vectors for blocks 464, 466 and 468 may be represented as $(v_{x,(p-1,q-1)}^k, v_{y,(p-1,q-1)}^k)$, $(v_{x,(p-1,q)}^k, v_{y,(p-1,q)}^k)$ and $(v_{x,(p,q-1)}^k, v_{y,(p,q-1)}^k)$ respectively. The motion vector for block 470 $(v_x, v_y)$ may be estimated based on the motion vectors for blocks 456, 458, 460, 462, 464, 466 and 468. In accordance with an embodiment of the invention, a block matching motion-estimation algorithm may be utilized to minimize the cost function illustrated in equation (2.1 a).

Figure 5A:
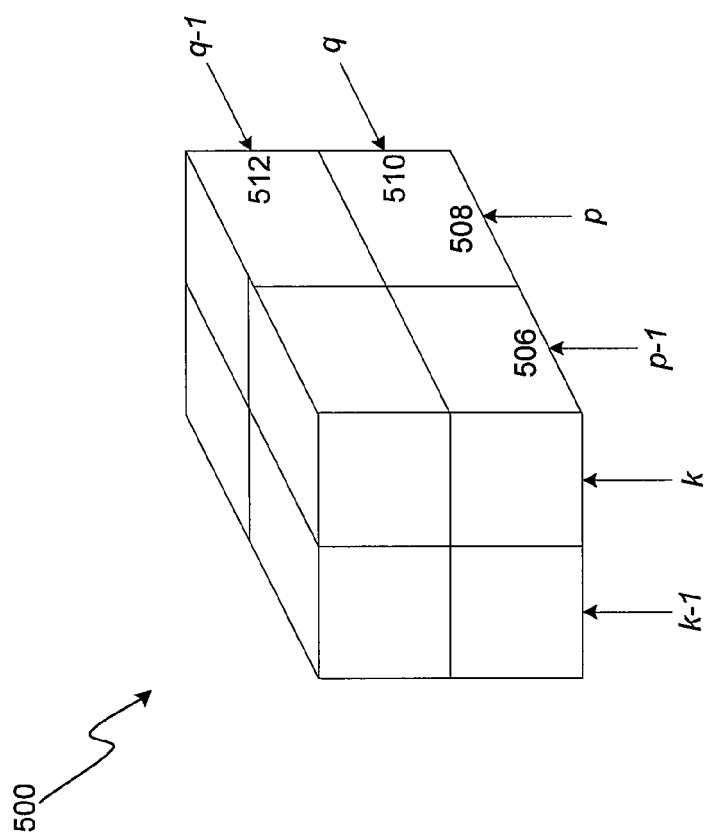
FIG. 5A is a block diagram illustrating exemplary directions of motion vector partial derivatives, in accordance with an embodiment of the invention.

FIG. 5A is a block diagram illustrating exemplary directions of motion vector partial derivatives, in accordance with an embodiment of the invention. Referring to FIG. 5A, there is shown a portion of a cube 500 with a plurality of edges. A plurality of partial derivatives of motion vectors at block (p,q) that may be estimated from an average of first differences along four parallel edges of the cube 500. For example, a plurality of partial derivatives of motion vectors at block (p,q) may be estimated from an average of first differences along the parallel edges, 506, 508, 510 and 512 of the cube 500.

Figure 5B:
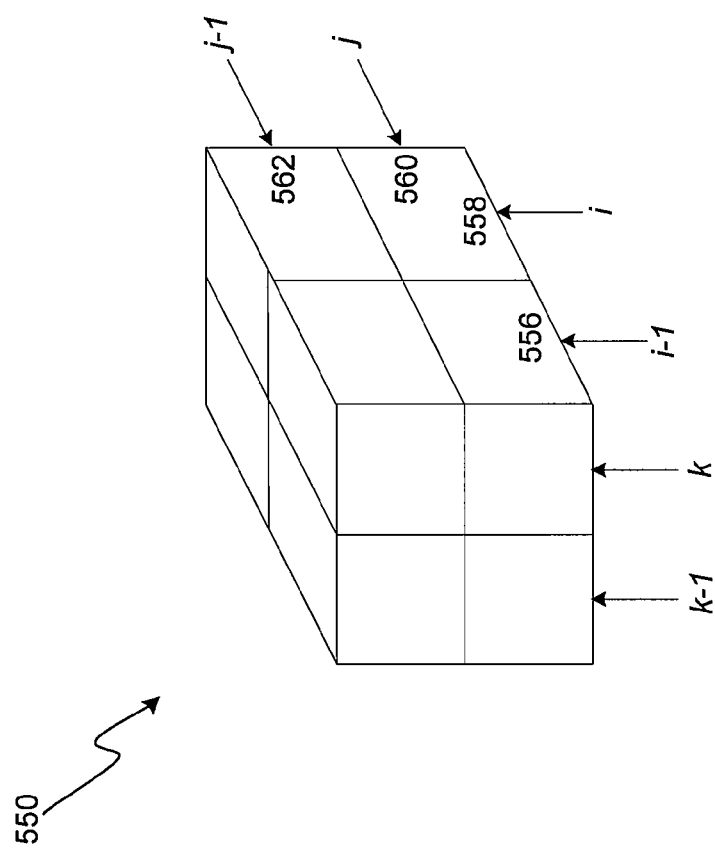
FIG. 5B is a block diagram illustrating exemplary directions of pixel value partial derivatives, in accordance with an embodiment of the invention.

FIG. 5B is a block diagram illustrating exemplary directions of pixel value partial derivatives, in accordance with an embodiment of the invention. Referring to FIG. 5B, there is shown a portion of a cube 550 with a plurality of edges. A plurality of partial derivatives of pixel values at block (i,j) that may be estimated from an average of first differences along four parallel edges of the cube 550. For example, a plurality of partial derivatives of pixel values at block (i,j) may be estimated from an average of first differences along the parallel edges, 556, 558, 560 and 562 of the cube 550.

Figure 6:
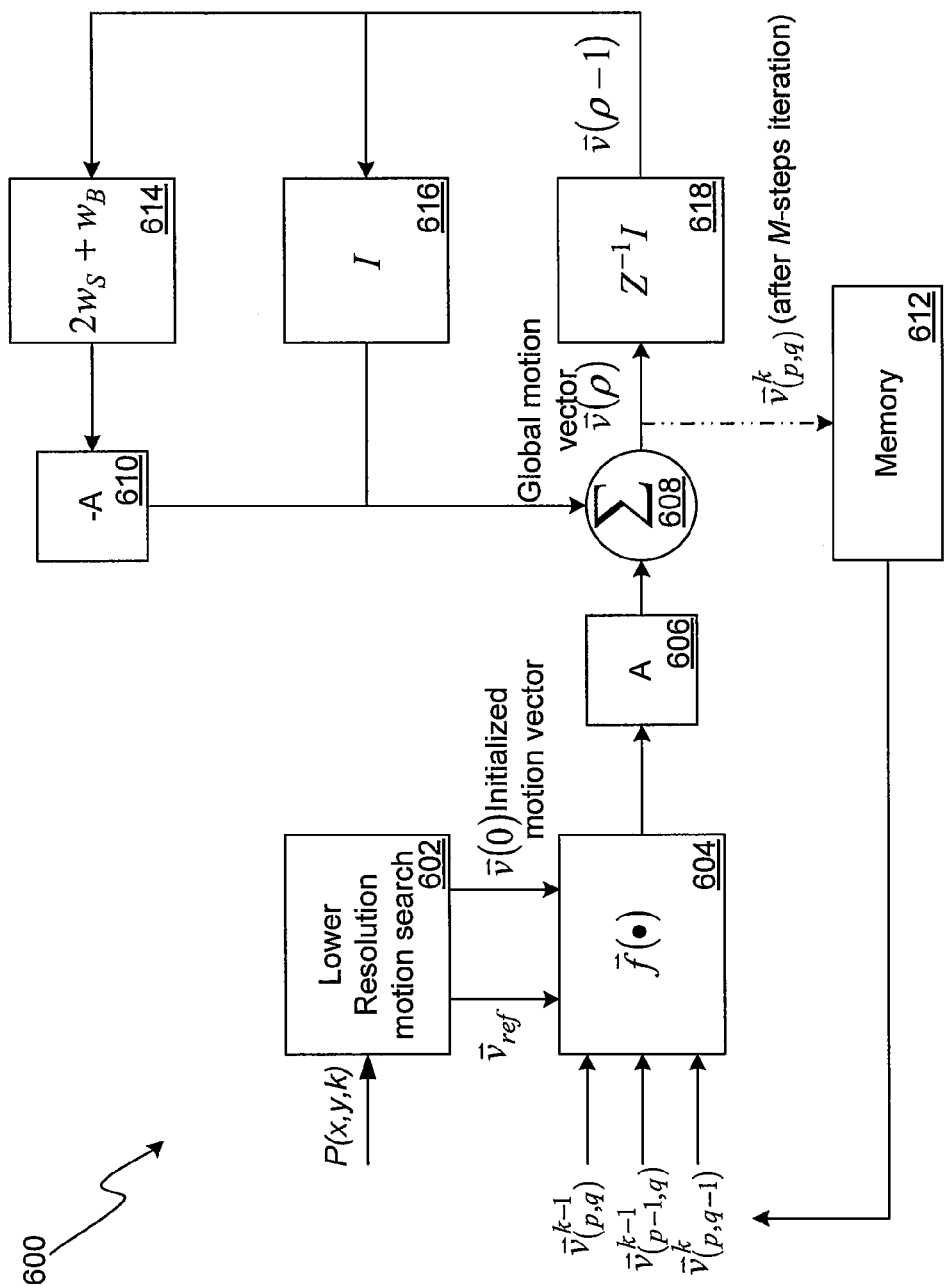
FIG. 6 is an exemplary signal flow diagram illustrating optical flow based motion vector estimation for picture rate up-conversion (PRUC), in accordance with an embodiment of the invention.

FIG. 6 is an exemplary signal flow diagram illustrating optical flow based motion vector estimation for picture rate up-conversion (PRUC), in accordance with an embodiment of the invention. Referring to FIG. 6, there is shown a motion estimation system 600. The motion estimation system 600 may comprise a motion search block 602, a function block 604, a plurality of constant blocks 606, 616 and 610, an adaptive parameters block 614, an inverse delay block 618, a summer 608 and a memory 612.

The cost optimization problem illustrated in equation (2.1) may have a unique solution as in the continuous case. The equation (2.2) may represent a sufficient condition for a unique solution.

$$J'(\bar{v}, w_S, w_B) = 0 \qquad (2.2)$$

where $J(\bar{v}, w_S, w_B)$ may be assumed to be sufficiently regular and at least twice continuously differentiable. The gradient descent on the cost function illustrated in equation (2.1) may be used as to update an iterative motion estimation algorithm. The changes of each motion vector component $v_x$ and $v_y$ may be negatively proportional to the partial gradients of the cost function, for example, $$\dot{v}_x \propto -\frac{\partial J(\bar{v}, w_S, w_B)}{\partial v_x} \text{ and } \dot{v}_y \propto -\frac{\partial J(\bar{v}, w_S, w_B)}{\partial v_y}$$

until reaching the steady state. The following linear partial differential equations may be generated:

$$\dot{v}_x = -A \cdot \left( \begin{array}{l} \sum_{i=pm}^{pm+m-1} \sum_{j=qn}^{qn+n-1} B_{x_i, y_j} \cdot E(x_i, y_j, k; v_x, v_y, 1) + \\ w_S \cdot (3v_x - v_{x,(p-1,q)}^k - v_{x,(p,q-1)}^k - v_{x(p,q)}^{k-1}) + \\ w_B \cdot (v_x - v_{x_{ref}}) \end{array} \right) \qquad (2.3)$$

$$\dot{v}_y = -A \cdot \left( \begin{array}{l} \sum_{i=pm}^{pm+m-1} \sum_{j=qn}^{qn+n-1} C_{x_i, y_j} \cdot E(x_i, y_j, k; v_x, v_y, 1) + \\ w_S \cdot (3v_y - v_{y,(p-1,q)}^k - v_{y,(p,q-1)}^k - v_{y(p,q)}^{k-1}) + \\ w_B \cdot (v_y - v_{y_{ref}}) \end{array} \right)$$

where $E(x_i, y_j, k; v_x, v_y, 1) = E(x_i, y_j, k) - E(x_i, +v_x, y_j + v_y, k-1)$ A may be a positive constant and $$B_{x_i, y_j} = \frac{\partial P}{\partial x_i}, C_{x_i, y_j} = \frac{\partial P}{\partial y_j}.$$

A steepest descent (SD) algorithm may be used to find a solution to equation (2.3). The SD algorithm may use a previously generated global motion vector (GMV) $\bar{v}(\rho-1)$ and update it using an instantaneous gradient of the temporal squared error, for example, $E(x_i, y_j, k; v_x, v_y, 1)$ and generate a recursive equation (2.4):

$$\bar{v}(\rho) = \bar{v}(\rho-1) + A \cdot (\bar{f}(\bar{v}(0), \bar{v}_{(p-1,q)}^k, \bar{v}_{(p,q-1)}^{k-1}, \bar{v}_{ref}) - (3w_S + w_B) \cdot \bar{v}(\rho-1)) \qquad (2.4)$$

where $$\bar{v}(\rho) = \begin{pmatrix} v_x(\rho) \\ v_y(\rho) \end{pmatrix}$$

and $\rho$ may be the iteration step. Assuming $B_{x_i, y_j}$ and $C_{x_i, y_j}$ to be constants for each m×n block, equation (2.5) may be generated:

$$\bar{f}(\bar{v}(0), \bar{v}_{(p-1,q)}^k, \bar{v}_{(p,q-1)}^k, \bar{v}_{(p,q)}^{k-1}, \bar{v}_{ref}) = \qquad (2.5)$$

$$\left( \begin{array}{l} -B_{p,q} \sum_{i=pm}^{pm+m-1} \sum_{j=qn}^{qn+n-1} E(x_i, y_j, k; \bar{v}^T(0), 1) + \\ w_S \cdot (v_{x,(p-1,q)}^k + v_{x,(p,q-1)}^k + v_{x,(p,q)}^{k-1}) + w_B \cdot v_{x_{ref}} \\ -C_{p,q} \sum_{i=pm}^{pm+m-1} \sum_{j=qn}^{qn+n-1} E(x_i, y_j, k; \bar{v}^T(0), 1) + \\ w_S \cdot (v_{y,(p-1,q)}^k + v_{y,(p,q-1)}^k + v_{y,(p,q)}^{k-1}) + w_B \cdot v_{y_{ref}} \end{array} \right)$$

where the initial motion vector $\vec{v}(0)$ may be computed by a simple block matching search algorithm and $B_{x_p, y_q}$ and $C_{x_p, y_q}$ may be estimated, for example, by the block boundary pixel difference. Equation (2.4) may represent one iteration of the steepest decent algorithm. The parameter A, referred to as the step-size, may control the size of an incremental correction applied to the motion vector for each iteration. The parameter A may be determined such that the algorithm illustrated in equation (2.4) is stable. For fast moving scenes, $\bar{v}_{(p,q)}^{k-1}$ in equations (2.4) and (2.5) may be replaced by a motion vector of the block in the k−1 picture pointed by the vector $-\bar{v}(0)$ from the block (p,q) in picture k.

The motion search block 602 may comprise suitable logic, circuitry, and/or code that may be enabled to receive a plurality of input pixels P(x,y,k) and generate a reference motion vector $\bar{v}_{ref} = (v_{x_{ref}}, v_{y_{ref}})$ and an initialized motion vector $\bar{v}(0)$. The function block 604 may be enabled to receive a motion vector associated with a block (p,q) corresponding to picture k−1 402 $\bar{v}_{(p,q)}^{k-1}$, a motion vector associated with a block (p−1,q) corresponding to picture k−1 402 $\bar{v}_{(p-1,q)}^{k-1}$ and a motion vector associated with a block (p,q−1) corresponding to picture k 404 $\bar{v}_{(p,q-1)}^k$.

The constant block 606 may be enabled to multiply the output of the function block 604 and generate an output to the summer 608. The inverse delay block 618 may be enabled to generate a previously generated GMV $\bar{v}(\rho-1)$. The adaptive parameters block 614 may comprise the adaptive smoothness parameter $w_S$ and the adaptive bias parameter $w_B$. The constant blocks 616 and 610 and the adaptive parameters block 614 may be enabled to manipulate the previously generated GMV $\vec{v}(\rho-1)$ based on the equation (2.4) and generate an output to the summer 608.

The summer 608 may be enabled to add the output of the constant block 606 and the outputs generated by the constant blocks 610 and 616 in order to generate the current GMV $\vec{v}(\rho)$, where $$\vec{v}(\rho) = \begin{pmatrix} v_x(\rho) \\ v_y(\rho) \end{pmatrix}$$

and $\rho$ may be the iteration step. After M iteration steps, the generated GMV $\vec{v}_{(p,q)}^k$ may be stored in the memory 612. The memory 612 may be enabled to feedback the stored motion vectors to the function block 604.

In accordance with another embodiment of the invention, the cost optimization problem illustrated in equation (2.1 a) may have a unique solution similar to the continuous case.

$$J(\vec{v}, w_S, w_B; k) = \sum_{i=pm}^{pm+m-1} \sum_{j=qn}^{qn+n-1} \left( \frac{\partial P}{\partial x} v_x + \frac{\partial P}{\partial y} v_y + \frac{\partial P}{\partial t} \right)^2 + \\ w_S \cdot \left( \frac{1}{16}(v_x - \bar{v}_x^{(x)})^2 + \frac{1}{16}(v_x - \bar{v}_x^{(y)})^2 + \frac{1}{16}(v_y - \bar{v}_y^{(x)})^2 + \frac{1}{16}(v_y - \bar{v}_y^{(y)})^2 \right) + w_B \cdot \left( (v_x - v_{x_{ref}})^2 + (v_y - v_{y_{ref}})^2 \right) \quad (3.2a)$$

A sufficient condition for a unique solution may be $$\frac{\partial J(\vec{v}, w_S, w_B; k)}{\partial v_x} = 0 \quad (3.2b)$$

$$= 2 \sum_{i=pm}^{pm+m-1} \sum_{j=qn}^{qn+n-1} \frac{\partial P}{\partial x} \cdot \left( \frac{\partial P}{\partial x} v_x + \frac{\partial P}{\partial y} v_y + \frac{\partial P}{\partial t} \right) + \frac{w_S}{8} \cdot (2v_x - (\bar{v}_x^{(x)} + \bar{v}_x^{(y)})) + 2 \cdot w_B \cdot (v_x - v_{x_{ref}})$$

$$\frac{\partial J(\vec{v}, w_S, w_B; k)}{\partial v_y} = 0$$

$$= 2 \sum_{i=pm}^{pm+m-1} \sum_{j=qn}^{qn+n-1} \frac{\partial P}{\partial y} \cdot \left( \frac{\partial P}{\partial x} v_x + \frac{\partial P}{\partial y} v_y + \frac{\partial P}{\partial t} \right) + \frac{w_S}{8} \cdot (2v_y - (\bar{v}_y^{(x)} + \bar{v}_y^{(y)})) + 2 \cdot w_B \cdot (v_y - v_{y_{ref}})$$

The equations in (3.2b) may yield $$\left( 2 \sum_{i=pm}^{pm+m-1} \sum_{j=qn}^{qn+n-1} \left( \frac{\partial P}{\partial x} \right)^2 + \left( \frac{w_S}{4} + w_B \right) \right) \cdot v_x + \quad (3.3)$$

$$\left( 2 \sum_{i=pm}^{pm+m-1} \sum_{j=qn}^{qn+n-1} \frac{\partial P}{\partial x} \cdot \frac{\partial P}{\partial y} \right) \cdot v_y =$$

$$\left( \frac{w_S \cdot (\bar{v}_x^{(x)} + \bar{v}_x^{(y)})}{8} + 2 w_B v_{x_{ref}} \right) - 2 \sum_{i=pm}^{pm+m-1} \sum_{j=qn}^{qn+n-1} \frac{\partial P}{\partial x} \cdot \frac{\partial P}{\partial t}$$

$$\left( 2 \sum_{i=pm}^{pm+m-1} \sum_{j=qn}^{qn+n-1} \frac{\partial P}{\partial y} \cdot \frac{\partial P}{\partial x} \right) \cdot v_x +$$

$$\left( 2 \sum_{i=pm}^{pm+m-1} \sum_{j=qn}^{qn+n-1} \left( \frac{\partial P}{\partial y} \right)^2 + \left( \frac{w_S}{4} + w_B \right) \right) \cdot v_y =$$

$$\left( \frac{w_S \cdot (\bar{v}_y^{(x)} + \bar{v}_y^{(y)})}{8} + 2 w_B v_{y_{ref}} \right) - 2 \sum_{i=pm}^{pm+m-1} \sum_{j=qn}^{qn+n-1} \frac{\partial P}{\partial y} \cdot \frac{\partial P}{\partial t}$$

where the derivatives in equations (3.1 a), (3.1 b), (3.2a), (3.2b) and (3.3) may be estimated as an average of four differences executed over adjacent pixel values according equation (3.4):

$\partial P/\partial x \approx \frac{1}{4}(P(i,j,k)-P(i-1,j,k)+P(i,j-1,k)-P(i-1,j-1,k)+P(i,j,k-1)-P(i-1,j,k-1)+P(i,j-1,k-1)-P(i-1,j-1,k-1))$ $\partial P/\partial x \approx \frac{1}{4}(P(i,j,k)-P(i,j-1,k)+P(i-1,j,k)-P(i-1,j-1,k)+P(i,j,k-1)-P(i,j-1,k-1)+P(i-1,j,k-1)-P(i-1,j-1,k-1))$ $\partial P/\partial x \approx \frac{1}{4}(P(i,j,k)-P(i,j,k-1)+P(i,j-1,k)-P(i,j-1,k-1)+P(i-1,j,k)-P(i-1,i,k-1)+P(i-1,j-1,k)-P(i-1,j-1,k-1))$ \quad (3.4)

The above three partial derivatives of pixel values at pixel (i,j) may be estimated from an average of first differences along four parallel edges of a cube similar to FIG. 5B.

The equation (3.3) may also be written in a matrix form as illustrated in equation (3.5a):

$$H \cdot \vec{v} - \vec{Q} = 0, \text{ or } \vec{v} = H^{-1} \cdot \vec{Q}, \quad (3.5a)$$

where $$H = \begin{pmatrix} 2\sum_{i=pm}^{pm+m-1}\sum_{j=qn}^{qn+n-1}\left(\frac{\partial P}{\partial x}\right)^2 + \left(\frac{w_S}{4}+w_B\right), & 2\sum_{i=pm}^{pm+m-1}\sum_{j=qn}^{qn+n-1}\frac{\partial P}{\partial x}\cdot\frac{\partial P}{\partial y} \\ 2\sum_{i=pm}^{pm+m-1}\sum_{j=qn}^{qn+n-1}\frac{\partial P}{\partial y}\cdot\frac{\partial P}{\partial x}, & 2\sum_{i=pm}^{pm+m-1}\sum_{j=qn}^{qn+n-1}\left(\frac{\partial P}{\partial y}\right)^2 + \left(\frac{w_S}{4}+w_B\right) \end{pmatrix},$$

$$\overline{Q} = \begin{pmatrix} \left(\frac{w_S\cdot(\overline{v}_x^{(x)}+\overline{v}_x^{(y)})}{8}+2w_B v_{x_{ref}}\right) - 2\sum_{i=pm}^{pm+m-1}\sum_{j=qn}^{qn+n-1}\frac{\partial P}{\partial x}\cdot\frac{\partial P}{\partial t} \\ \left(\frac{w_S\cdot(\overline{v}_y^{(x)}+\overline{v}_y^{(y)})}{8}+2w_B v_{y_{ref}}\right) - 2\sum_{i=pm}^{pm+m-1}\sum_{j=qn}^{qn+n-1}\frac{\partial P}{\partial y}\cdot\frac{\partial P}{\partial t} \end{pmatrix}.$$

A steepest descent (SD) algorithm may be used for solving equation (2.5a). The SD algorithm may utilize a previously generated GMV $\overline{v}(\rho-1)$ and update it using an instantaneous gradient of the squared error, or $J(\overline{v},w_S,w_B;k)$, and generate the following recursive equation:

$$\hat{\overline{v}}(\rho) = \hat{\overline{v}}(\rho-1) - \frac{\mu}{2}\cdot\frac{\partial J(\overline{v},w_S,w_B;k)}{\partial \overline{v}(\rho)}\bigg|_{\hat{v}(\rho-1)} \qquad (3.6)$$
$$= \hat{\overline{v}}(\rho-1) + \frac{\mu}{2}\cdot\left(\overline{Q}-H\cdot\hat{\overline{v}}(\rho-1)\right)$$

where $$\hat{\overline{v}}(\rho) = \begin{pmatrix} \hat{v}_x(\rho) \\ \hat{v}_y(\rho) \end{pmatrix}$$

and $\rho$ is the iteration step.

The motion search block 602 may be enabled to generate the initial motion vector $\overline{v}(0)$ by a block matching search algorithm. An extension of equation (3.6) may be $$\hat{\overline{v}}(k) = \hat{\overline{v}}(k-1) + \frac{\mu}{2}\cdot\left(\overline{Q}-H\cdot\hat{\overline{v}}(k-1)\right), \qquad (3.7)$$

In accordance with an embodiment of the invention, the quadratic surface representing the cost function may change in time due to the smoothness constraint. The iterative algorithm illustrated in the motion estimation block 600 may descend along the surface of $J(\overline{v},w_S,w_B;k)$ from the motion vector $\hat{\overline{v}}(k-1)$ with updated matrix H and the vector $\overline{Q}$ to a new position, governed by the local gradient of the surface to be minimized instead of minimizing $J(\overline{v},w_S,w_B;k)$ from the start. Equation (3.7) may represent one iteration of the steepest decent algorithm. The equation (3.7) may perform a single iteration and continue to the next temporal point instead of performing a plurality of iterations at each time instant as illustrated in equation (3.6).

The parameter $\mu$ in equations (3.6) and (3.7) may be referred to as the step size. The step size $\mu$ may control a size of an incremental correction that may be applied to the motion vector for each iteration cycle. The parameter $\mu$ may be determined according to equations (3.8a) and (3.8b):

$$\mu(\rho) = \frac{2\cdot\left(\overline{Q}-H\cdot\hat{v}(\rho-1)\right)^T\cdot\left(\overline{Q}-H\cdot\hat{v}(\rho-1)\right)}{\left(\overline{Q}-H\cdot\hat{v}(\rho-1)\right)^T\cdot H\cdot\left(\overline{Q}-H\cdot\hat{v}(\rho-1)\right)} \qquad (3.8a)$$

$$\mu(k) = \frac{2\cdot\left(\overline{Q}-H\cdot\hat{v}(k-1)\right)^T\cdot\left(\overline{Q}-H\cdot\hat{v}(k-1)\right)}{\left(\overline{Q}-H\cdot\hat{v}(k-1)\right)^T\cdot H\cdot\left(\overline{Q}-H\cdot\hat{v}(k-1)\right)} \qquad (3.8b)$$

In accordance with an embodiment of the invention, a normalized SD (NSD) algorithm may be utilized based on equations (3.8a) and (3.8b) to converge faster than a SD algorithm. The NSD algorithm may be a normalized least mean square (NLMS) algorithm where $\overline{Q}$ and H may be represented as an instantaneous estimate of $d_{\rho-1}\overline{X}_{\rho-1}$ and $X_{\rho-1}\overline{X}_{\rho-1}^T$ for a sequence of 2-dimensional vectors $\{\overline{X}_\rho\}$ and a sequence of scalars $\{d_\rho\}$).

Figure 7:
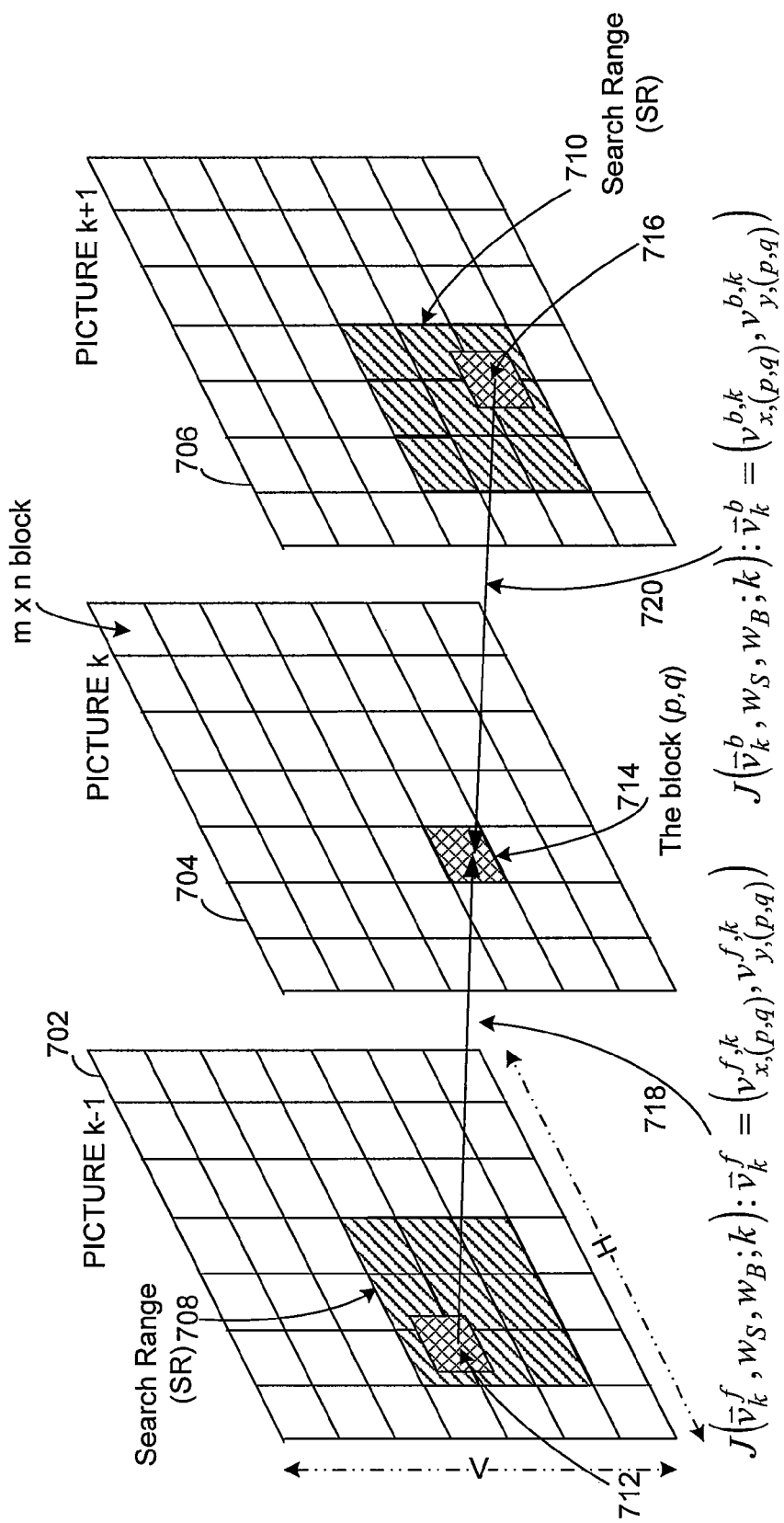
FIG. 7 is a block diagram illustrating a recursive search to estimate an optimal motion vector, in accordance with an embodiment of the invention.

FIG. 7 is a block diagram illustrating a recursive search to estimate an optimal motion vector, in accordance with an embodiment of the invention. Referring to FIG. 7, there is shown a previous picture, picture k−1 702 with a search range 708 and a block 712, a current picture, picture k 704 with a block (p,q) 714 and a next picture, picture k+1 706 with a search range 710 and a block 716.

In accordance with an embodiment of the invention, the iterative algorithm illustrated in motion estimation block 600 may descend along the surface of $J(\overline{v},w_S,w_B;k)$ from the motion vector $\hat{\overline{v}}(k-1)$ with $$\frac{\partial J(\overline{v},w_S,w_B;k)}{\partial \overline{v}(\rho)},$$

a best candidate motion vector $\overline{v}_k^*$ estimated at k for a block (p,q) may be obtained by solving the following equation:

$$\min_{\overline{v}\in SR} J(\overline{v},w_S,w_B;k) \qquad (3.9)$$

subject to $J(\overline{v}_k^*,w_S,w_B;k)\leq J(\overline{v}_{k-1}^*,w_S,w_B;k-1)$. The optimization process may be represented as $$\min_{\overline{v}_k^f\in SR}\left(J(\overline{v}_k^f,w_S,w_B;k)+J(\overline{v}_k^b,w_S,w_B;k)\right)$$

subject to $J(\overline{v}_k^f,w_S,w_B;k)\geq J(\overline{v}_k^b,w_S,w_B;k)$ and a search for the motion vector may converge to an optimal solution $\overline{v}_k^{otp}=\overline{v}_k^f$, to generate the motion vector for block 714 when $J(v_k^f,w_S,w_B;k)-J(\overline{v}_k^b,w_S,w_B;k)\leq Th\cdot J(v_k^f,w_S,w_B;k)$, where Th may be a programmable threshold value. The block 712 in the search range 708 may be utilized to generate the motion vector of block 714 based on $J(\overline{v}_k^f, w_S, w_B; k): \overline{v}_k^f = (v_{x,(p,q)}^k, v_{y,(p,q)}^k)$. The block 716 in the search range 710 may be utilized to generate the motion vector of block 714 based on $J(\overline{v}_k^b, w_S, w_B; k): \overline{v}_k^b (v_{x,(pq)}^{b,k}, v_{y,(p,q)}^{b,k})$ The pivot search may be used to determine the optimal motion vectors.

Figure 8:
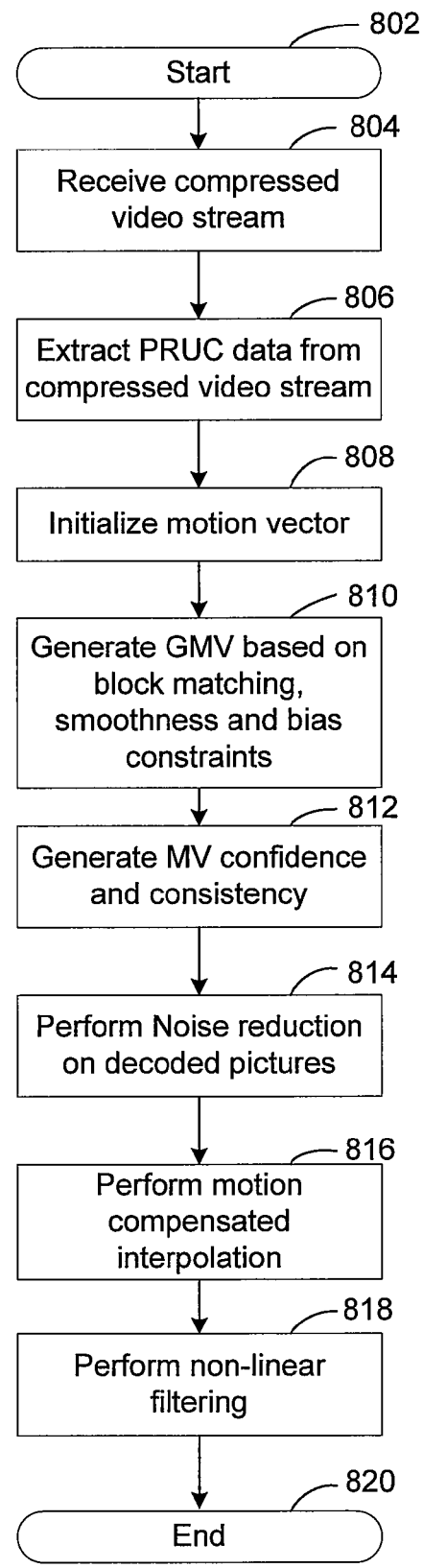
FIG. 8 is a flowchart illustrating exemplary steps for optical flow based motion vector estimation for PRUC, in accordance with an embodiment of the invention.

FIG. 8 is a flowchart illustrating exemplary steps for optical flow based motion vector estimation for PRUC, in accordance with an embodiment of the invention. Referring to FIG. 8, exemplary steps may begin at step 802. In step 804, a decompression engine 202 may be enabled to receive a compressed video data from an encoder 118. In step 806, a PRUC engine 204 may be enabled to extract PRUC data from the compressed video data while the compressed video data is being decompressed by the decompression engine 202. The PRUC data may comprise local block motion vectors, block coding modes, quantization levels, quantized residual data and decoded pictures.

In step 808, the motion search block 602 in the motion estimation block 600 may initialize the motion vector $\vec{v}(0)$. In step 810, the motion estimation block 600 may be enabled to generate a global motion vector $\vec{v}(\rho)$ based on optimizing a cost function comprising a block matching constraint, a smoothness constraint and a bias constraint, where P may be an iteration step.

In step 812, the MVCCM block 222 may be enabled to generate a motion vector confidence and consistency measurement value. In step 814, the noise reduction filter 226 may be enabled to perform digital noise reduction filtering on the extracted decoded pictures. In step 816, the motion compensated interpolation block 224 may be enabled to perform motion compensated interpolation in order to generate interpolated pictures. In step 818, the non-linear filtering block 228 may be enabled to detect scene changes and filter the interpolated pictures to reduce artifacts in the final output interpolated pictures. Control then passes to end step 820.

In accordance with an embodiment of the invention, a method and system for optical flow based motion vector estimation for PRUC may comprise a motion estimation block 216 that may enable generation of one or more motion vectors based on extracted picture rate up-conversion (PRUC) data by minimizing a cost function. The cost function may be constrained by any combination of a block matching constraint, a smoothness constraint and a bias constraint.

The cost function may be represented as $$J(\vec{v}, w_S, w_B) = \int_\Omega (E + w_S \cdot S + w_B \cdot B) d\Omega,$$

where $\vec{v}'' = \overline{O}$, $w_S$ is an adaptive smoothness parameter, S is a smoothness constraint, $w_B$ is an adaptive bias parameter and B is a bias constraint and $\Omega \subset R^2$. The block matching constraint may be represented as $$E(x, y, t; v_x, v_y, \Delta t) = \left(\frac{\partial P}{\partial x} v_x + \frac{\partial P}{\partial y} v_y + \frac{\partial P}{\partial t} \Delta t\right)^2,$$

where P is a brightness distribution in an image space (x,y) and time t, and $v_x$ and $v_y$ are motion vectors in the image space (x,y). The smoothness constraint may be represented as $$S(\vec{v}) = \left(\frac{\partial v_x}{\partial x}\right)^2 + \left(\frac{\partial v_x}{\partial y}\right)^2 + \left(\frac{\partial v_y}{\partial x}\right)^2 + \left(\frac{\partial v_y}{\partial y}\right)^2 + \left(\frac{\partial v_x}{\partial t}\right)^2 + \left(\frac{\partial v_y}{\partial t}\right)^2,$$

where $\vec{v}$ is the generated motion vector. The bias constraint may be represented as $B(\vec{v}, \vec{v}_{ref}) = (v_x - v_{x_{ref}})^2 + (v_y - v_{y_{ref}})^2$, where $\vec{v}_{ref}$ is a reference motion vector. The motion estimation block 216 may be enabled to dynamically update the adaptive smoothness parameter $w_S$ and the adaptive bias parameter $w_B$ iteratively using a steepest descent algorithm, for example.

The PRUC engine 204 may be enabled to extract PRUC data from a compressed video data stream while the compressed video data stream is being decompressed by the video decompression engine 202. The PRUC data may comprise local block motion vectors, block coding modes, quantization levels, quantized residual data and decoded pictures. The PRUC engine 204 may be enabled to generate a plurality of interpolated pictures based on the extracted PRUC data.

The decompression engine 202 may be enabled to generate the decoded pictures based on decompressing the compressed video data stream. The PRUC engine 204 may comprise a pixel motion vector generation block 216, a motion vector confidence and consistency measurement (MVCCM) block 222, a motion compensated interpolation block 224, a noise reduction filer 226 and a non-linear filtering block 228. The pixel motion vector generation block 216 may comprise a block motion vector refinement block 218 and a scaling block 220.

The noise reduction filter 226 may be enabled to perform digital noise reduction filtering on the extracted decoded pictures in order to reduce noise. The pixel motion vector generation block 216 may be enabled to generate one or more motion vectors based on the received block motion vectors. The generated motion vectors may comprise one or more local motion vectors and a global motion vector. The pixel motion vector generation block 216 may be enabled to accumulate a plurality of block motion vectors in order to generate the global motion vector.

The scaling block 220 may be enabled to scale the generated motion vectors. The pixel motion vector generation block 216 may be enabled to generate pixel motion vectors based on the scaling of the generated motion vectors. The MVCCM block 222 may be enabled to generate at least one of a confidence value and a consistency value of the generated motion vectors based on the quantized residue data extracted from the video decompression engine 202.

The motion compensated interpolation block 224 may be enabled to generate motion compensated interpolated pictures. The non-linear filtering block 228 may be enabled to filter the generated interpolated pictures in order to reduce artifacts in the final output interpolated pictures.

Another embodiment of the invention may provide a machine-readable storage, having stored thereon, a computer program having at least one code section executable by a machine, thereby causing the machine to perform the steps as described herein for optical flow based motion vector estimation for PRUC.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video data, the method comprising:
   generating one or more motion vectors based on extracted picture rate up-conversion (PRUC) data by minimizing a cost function, wherein said cost function is constrained by one or more of:
   a block matching constraint, a smoothness constraint and/or a bias constraint, wherein said block matching constraint is represented as $$E(x, y, t, v_x, v_y, \Delta t) = \left(\frac{\partial P}{\partial x}v_x + \frac{\partial P}{\partial y}v_y + \frac{\partial P}{\partial t}\Delta t\right)^2,$$

where P is a brightness distribution in an image space (x,y) and time t, and $v_x$ and $v_y$ are motion vectors in said image space (x,y), wherein $\partial P/\partial x$, $\partial P/\partial y$ comprise partial derivatives of P in the image space (x,y) and $\partial P/\partial t$ comprises a partial derivative of P in time t.

2. The method according to claim 1, wherein said smoothness constraint is represented as $$S(\vec{v}) = \left(\frac{\partial v_x}{\partial x}\right)^2 + \left(\frac{\partial v_x}{\partial y}\right)^2 + \left(\frac{\partial v_y}{\partial x}\right)^2 + \left(\frac{\partial v_y}{\partial y}\right)^2 + \left(\frac{\partial v_x}{\partial t}\right)^2 + \left(\frac{\partial v_y}{\partial t}\right)^2,$$

where $\vec{v}$ is said generated one or more motion vectors.

3. The method according to claim 2, wherein said bias constraint is represented as where $B(\vec{v}, \vec{v}_{ref}) = (v_x - v_{x_{ref}})^2 + (v_y - v_{y_{ref}})^2$, where $\vec{v}_{ref}$, $v_{x_{ref}}$, and $v_{y_{ref}}$ are reference motion vectors.

4. The method according to claim 3, wherein said cost function is represented as $$J(\vec{v}, w_S, w_B) = \int_\Omega (E + w_S \cdot S + w_B \cdot B) d\Omega,$$

where $\vec{v}'' = \vec{0}$, $w_S$ is an adaptive smoothness parameter, S is said smoothness constraint, $w_B$ is an adaptive bias parameter and B is said bias constraint and $\Omega \subset R^2$.

5. The method according to claim 4, comprising dynamically updating said adaptive smoothness parameter $w_S$ and said adaptive bias parameter $w_B$.

6. The method according to claim 3, wherein said cost function is represented as $$J(\vec{v}, w_S, w_B) = \sum_{i=pm}^{pm+m-1} \sum_{j=qn}^{qn+n-1} (P(x_i, y_j, k) - P(x_i + v_x, y_j + v_y, k-1))^2 +$$
$$w_S \cdot ((v_x - v_{x,(p-1,q)}^k)^2 + (v_y - v_{y,(p-1,q)}^k)^2 + (v_x - v_{x,(p,q-1)}^k)^2 +$$
$$(v_y - v_{y,(p,q-1)}^k)^2 + (v_x - v_{x,(p,q)}^{k-1})^2 + (v_y - v_{y,(p,q)}^{k-1})^2) +$$
$$w_B \cdot ((v_x - v_{x_{ref}})^2 + (v_y - v_{y_{ref}})^2),$$

where $w_S$ is an adaptive smoothness parameter, $w_B$ is an adaptive bias parameter, k is an index of a picture number and $v_{b,(c,d)}^a$ is a previously estimated motion vector in a picture a for b direction and at a grid location (c,d).

7. The method according to claim 6, wherein a sufficient condition for a unique solution for said cost function is $\vec{v} = H^{-1} \cdot \overline{Q}$, where $$H = \begin{pmatrix} 2\sum_{i=pm}^{pm+m-1}\sum_{j=qn}^{qn+n-1}\left(\frac{\partial P}{\partial x}\right)^2 + \left(\frac{w_S}{4} + w_B\right), & 2\sum_{i=pm}^{pm+m-1}\sum_{j=qn}^{qn+n-1}\frac{\partial P}{\partial x}\cdot\frac{\partial P}{\partial y} \\ 2\sum_{i=pm}^{pm+m-1}\sum_{j=qn}^{qn+n-1}\frac{\partial P}{\partial y}\cdot\frac{\partial P}{\partial x}, & 2\sum_{i=pm}^{pm+m-1}\sum_{j=qn}^{qn+n-1}\left(\frac{\partial P}{\partial y}\right)^2 + \left(\frac{w_S}{4} + w_B\right) \end{pmatrix},$$

and $$\overline{Q} = \begin{pmatrix} \left(\frac{w_S \cdot (\overline{v}_x^{(x)} + \overline{v}_x^{(y)})}{8} + 2w_B v_{x_{ref}}\right) - 2\sum_{i=pm}^{pm+m-1}\sum_{j=qn}^{qn+n-1}\frac{\partial P}{\partial x}\cdot\frac{\partial P}{\partial t} \\ \left(\frac{w_S \cdot (\overline{v}_y^{(x)} + \overline{v}_y^{(y)})}{8} + 2w_B v_{y_{ref}}\right) - 2\sum_{i=pm}^{pm+m-1}\sum_{j=qn}^{qn+n-1}\frac{\partial P}{\partial y}\cdot\frac{\partial P}{\partial t} \end{pmatrix}.$$

8. The method according to claim 7, comprising solving said cost function using $$\hat{v}(\rho) = \hat{v}(\rho-1) - \frac{\mu}{2} \cdot \frac{\partial J(\overline{v}, w_S, w_B; k)}{\partial \overline{v}(\rho)}\bigg|_{\hat{v}(\rho-1)}$$

$$= \hat{v}(\rho-1) + \frac{\mu}{2} \cdot (\overline{Q} - H \cdot \hat{v}(\rho-1)),$$

where $$\hat{v}(\rho) = \begin{pmatrix} \hat{v}_x(\rho) \\ \hat{v}_y(\rho) \end{pmatrix},$$

$\rho$ is an iteration step and parameter $\mu$ is a step size for iteration.

9. The method according to claim 7, comprising solving said cost function using $$\hat{v}(k) = \hat{v}(k-1) + \frac{\mu}{2} \cdot (\overline{Q} - H \cdot \hat{v}(k-1)),$$

where parameter $\mu$ is a step size for iteration.

10. A system for processing video data, the system comprising:
one or more circuits that enables generation of one of more motion vectors based on extracted picture rate up-conversion (PRUC) data by minimizing a cost function, wherein said cost function is constrained by one or more of: a block matching constraint, a smoothness constraint and/or bias constraint, wherein said block matching constraint is represented as $$E(x, y, t; v_x, v_y, \Delta t) = \left(\frac{\partial P}{\partial x}v_x + \frac{\partial P}{\partial y}v_y + \frac{\partial P}{\partial t}\Delta t\right)^2,$$

where P is a brightness distribution in an image space (x,y) and time t, and $v_x$ and $v_y$ are motion vectors in said image space (x,y), wherein $\partial P/\partial x$, $\partial P/\partial y$ comprise partial derivatives of P in the image space (x,y), and $\partial P/\partial t$ comprises a partial derivative of P in time t.

11. The system according to claim 10, wherein said smoothness constraint is represented as $$S(\overline{v}) = \left(\frac{\partial v_x}{\partial x}\right)^2 + \left(\frac{\partial v_x}{\partial y}\right)^2 + \left(\frac{\partial v_y}{\partial x}\right)^2 + \left(\frac{\partial v_y}{\partial y}\right)^2 + \left(\frac{\partial v_x}{\partial t}\right)^2 + \left(\frac{\partial v_y}{\partial t}\right)^2,$$

where $\vec{v}$ is said generated one or more motion vectors.

12. The system according to claim 11, wherein said bias constraint is represented as $B(\overline{v}, \overline{v}_{ref}) = (v_x - v_{x_{ref}})^2 + (v_y - v_{y_{ref}})^2$, where $\vec{v}_{ref}$, $v_{x_{ref}}$ and $v_{y_{ref}}$ are reference motion vectors.

13. The system according to claim 12, wherein said cost function is represented as $$J(\overline{v}, w_S, w_B) = \int_\Omega (E + w_S \cdot S + w_B \cdot B) d\Omega,$$

where $\overline{v}'' = \overline{O}$, $w_S$ is an adaptive smoothness parameter, S is said smoothness constraint, $w_B$ is an adaptive bias parameter and B is said bias constraint and $\Omega \subset {}^2$.

14. The system according to claim 13, wherein said one or more circuits enables dynamic updating of said adaptive smoothness parameter $w_S$ and said adaptive bias parameter $w_B$.

15. The system according to claim 12, wherein said cost function is represented as $$J(\overline{v}, w_S, w_B) = \sum_{i=pm}^{pm+m-1}\sum_{j=qn}^{qn+n-1}(P(x_i, y_j, k) - P(x_i + v_x, y_j + v_y, k-1))^2 +$$
$$w_S \cdot \left((v_x - v_{x,(p-1,q)}^k)^2 + (v_y - v_{y,(p-1,q)}^k)^2 + (v_x - v_{x,(p,q-1)}^k)^2 + \right.$$
$$\left.(v_y - v_{y,(p,q-1)}^k)^2 + (v_x - v_{x,(p,q)}^{k-1})^2 + (v_y - v_{y,(p,q)}^{k-1})^2\right) +$$
$$w_B \cdot \left((v_x - v_{x_{ref}})^2 + (v_y - v_{y_{ref}})^2\right),$$

where $w_S$ is an adaptive smoothness parameter, $w_B$ is an adaptive bias parameter, k is an index of a picture number and $v_{b,(c,d)}^a$ is a previously estimated motion vector in a picture a for b direction and at a grid location (c,d).

16. The system according to claim 15, wherein a sufficient condition for a unique solution for said cost function is $\overline{v} = H^{-1} \cdot \overline{Q}$, where $$H = \begin{pmatrix} 2\sum_{i=pm}^{pm+m-1}\sum_{j=qn}^{qn+n-1}\left(\frac{\partial P}{\partial x}\right)^2 + \left(\frac{w_S}{4} + w_B\right), & 2\sum_{i=pm}^{pm+m-1}\sum_{j=qn}^{qn+n-1}\frac{\partial P}{\partial x} \cdot \frac{\partial P}{\partial y} \\ 2\sum_{i=pm}^{pm+m-1}\sum_{j=qn}^{qn+n-1}\frac{\partial P}{\partial y} \cdot \frac{\partial P}{\partial x}, & 2\sum_{i=pm}^{pm+m-1}\sum_{j=qn}^{qn+n-1}\left(\frac{\partial P}{\partial y}\right)^2 + \left(\frac{w_S}{4} + w_B\right) \end{pmatrix},$$

and $$\overline{Q} = \begin{pmatrix} \left(\frac{w_S \cdot (\overline{v}_x^{(x)} + \overline{v}_x^{(y)})}{8} + 2w_B v_{x_{ref}}\right) - 2\sum_{i=pm}^{pm+m-1}\sum_{j=qn}^{qn+n-1}\frac{\partial P}{\partial x} \cdot \frac{\partial P}{\partial t} \\ \left(\frac{w_S \cdot (\overline{v}_y^{(x)} + \overline{v}_y^{(y)})}{8} + 2w_B v_{y_{ref}}\right) - 2\sum_{i=pm}^{pm+m-1}\sum_{j=qn}^{qn+n-1}\frac{\partial P}{\partial y} \cdot \frac{\partial P}{\partial t} \end{pmatrix}.$$

17. The system according to claim 16, wherein said one or more circuits enables solving of said cost function using $$\hat{\bar{v}}(\rho) = \hat{\bar{v}}(\rho - 1) - \frac{\mu}{2} \cdot \frac{\partial J(\bar{v}, w_S, w_B; k)}{\partial \bar{v}(\rho)} \bigg|_{\hat{v}(\rho-1)}$$
$$= \hat{\bar{v}}(\rho - 1) + \frac{\mu}{2} \cdot (\overline{Q} - H \cdot \hat{\bar{v}}(\rho - 1)),$$

where $$\hat{\bar{v}}(\rho) = \begin{pmatrix} \hat{v}_x(\rho) \\ \hat{v}_y(\rho) \end{pmatrix},$$

$\rho$ is an iteration step and parameter $\mu$ is a step size for iteration.

18. The system according to claim 16, wherein said one or more circuits enables solving of said cost function using $$\hat{\bar{v}}(k) = \hat{\bar{v}}(k - 1) + \frac{\mu}{2} \cdot (\overline{Q} - H \cdot \hat{\bar{v}}(k - 1)),$$

where parameter $\mu$ is a step size for iteration.

* * * * *